(12) United States Patent
Chen et al.

(10) Patent No.: US 9,332,092 B2
(45) Date of Patent: May 3, 2016

(54) METHOD AND SYSTEM FOR PROCESSING DATA RECORD PACKET

(71) Applicant: ZTE Corporation, Shenzhen, Guangdong (CN)

(72) Inventors: Qihua Chen, Shenzhen (CN); Changcheng Zhong, Shenzhen (CN)

(73) Assignee: ZTE Corporation, Shenzhen, Guangdong (CN)

( * ) Notice: Subject to any disclaimer, the term of this patent is extended or adjusted under 35 U.S.C. 154(b) by 130 days.

(21) Appl. No.: 14/356,857

(22) PCT Filed: Nov. 12, 2012

(86) PCT No.: PCT/CN2012/084485
§ 371 (c)(1),
(2) Date: Jun. 11, 2014

(87) PCT Pub. No.: WO2013/067975
PCT Pub. Date: May 16, 2013

(65) Prior Publication Data
US 2014/0293879 A1    Oct. 2, 2014

(30) Foreign Application Priority Data
Nov. 11, 2011    (CN) .......................... 2011 1 0357581

(51) Int. Cl.
*H04Q 7/00*    (2006.01)
*H04L 29/06*    (2006.01)
(Continued)

(52) U.S. Cl.
CPC ............ *H04L 69/22* (2013.01); *H04L 12/1453* (2013.01); *H04L 45/74* (2013.01);
(Continued)

(58) Field of Classification Search
None
See application file for complete search history.

(56) References Cited

U.S. PATENT DOCUMENTS 7,417,948 B2    8/2008    Sjöblom
7,787,861 B2 *  8/2010    Salo .................. H04L 12/14
                                                455/406
(Continued)

FOREIGN PATENT DOCUMENTS

| CN | 1341308 A | 3/2002 |
|---|---|---|
| CN | 101145893 A | 3/2008 |
| CN | 101778367 A | 7/2010 |

OTHER PUBLICATIONS

3GPP Standards 2500 Wilson Boulevard XP040275677, General Packet Radio Service(GPRS) mailed on Dec. 1, 2002.
(Continued)

*Primary Examiner* — Duc C Ho
(74) *Attorney, Agent, or Firm* — Oppedahl Patent Law Firm LLC

(57) ABSTRACT

A method for processing a Data Record Packet includes: a General Packet Radio Service Supported Node (GSN) sends a Data Record Packet to a Charging Gateway Function (CGF), wherein the Data Record Packet is a normal packet or a possibly duplicated packet, and the message header of a message for sending Data Record Packet includes a sequence number and the message body includes packaging time; and the CGF sends a response message of receiving the Data Record Packet to the GSN, wherein the Packet Transfer Response Command information element in the response message is used to indicate whether the response message is for the normal packet or the possibly duplicated packet. Therefore, the problem that possibly duplicated packets occupy sequence number resources is solved without limiting the network transmission speed.

20 Claims, 11 Drawing Sheets

(51) Int. Cl.
H04L 12/14 (2006.01)
H04M 15/00 (2006.01)
H04L 12/741 (2013.01)
H04L 12/801 (2013.01)

(52) U.S. Cl.
CPC .............. *H04L 47/34* (2013.01); *H04M 15/41* (2013.01); *H04M 15/73* (2013.01); *H04M 15/74* (2013.01); *H04M 15/8214* (2013.01)

(56) References Cited

U.S. PATENT DOCUMENTS

| | | | |
|---|---|---|---|
| 8,031,593 B2 | 10/2011 | Sjoblom | |
| 2002/0009053 A1 | 1/2002 | Sjoblom | |
| 2007/0036312 A1* | 2/2007 | Cai | H04M 15/00 379/126 |
| 2008/0263424 A1 | 10/2008 | Sjoblom | |
| 2011/0194497 A1* | 8/2011 | Lundin | H04L 12/5695 370/328 |
| 2012/0009895 A1* | 1/2012 | Kotalwar | H04L 12/14 455/406 |
| 2012/0020301 A1 | 1/2012 | Sjöblom | |

OTHER PUBLICATIONS

Supplementary European Search Report in European application No. 12847928.4, mailed on Aug. 11, 2015.
International Search Report in international application No. PCT/CN2012/084485, mailed on Feb. 28, 2013. (2 pages—see entire document).
English Translation of the Written Opinion of the International Search Authority in international application No. PCT/CN2012/084485, mailed on Feb. 28, 2013. (7 pages—see entire document).

* cited by examiner

PRIOR ART

PRIOR ART

METHOD AND SYSTEM FOR PROCESSING DATA RECORD PACKET

TECHNICAL FIELD

The disclosure relates to the field of communications, and in particular to a method and system for processing a Data Record Packet.

BACKGROUND

In a telecommunication network described by the 3rd Generation Partnership Project (3GPP), main functions of GTP' (a GPRS Protocol, used for CDR transport) V2 are described as follows.

FIG. 1 shows relationship between a Charging Trigger Function (CTF), a Charging Data Function (CDF) and a Charging Gateway Function (CGF), where the Ga interface is a communication interface for transmitting Charging Data Records (CDRs) from the CDF to CGF, and the Ga interface complies with the GTP'.

FIG. 2 shows bearers of the GTP'. It can be seen from the figure that the GTP' may be based on a User Datagram Protocol (UDP) or a Transmission Control Protocol (TCP).

The GTP' is mainly defined as follows.

I) GTP' Message Header

The GTP' message header reuses the General Packet Radio Service Tunneling Protocol (GTP) message header (GTP Message Header), as shown in FIG. 3, in the GTP Message Header, several flag bits (such as Version, PT, etc.), the message type, the length and the sequence number are defined, where Version refers to a version number, and PT refers to a protocol type.

II) GTP' Message Type

Below are types of messages used by the GTP', the first three types reuse the message type of the GTP, and the following six types are newly-added message types of the GTP'.

1. Echo Request (a handshake request sending to a correspondent node);
2. Echo Response (a response to a handshake request from a correspondent node);
3. Version not supported (a response indicating that a current node does not support version of a message sent by a correspondent node and notifying the newest version number which the current node can support, this message does not need to be responded to);
4. Node Alive Request (a notification to a correspondent node that the current node is alive);
5. Node Alive Response (a response to a Node Alive Request from a correspondent node);
6. Redirection Request (a notification of CGF to GSN, and instructing GSN to send a data record to other CGFs);
7. Redirection Response (a response to a Redirection Request from CGF by GSN);
8. Data Record Transfer Request (GSN sending a Data Record Packet to CGF); and
9. Data Record Transfer Response (a response to a Data Record Transfer Request from GSN by CGF).

Among the above messages, the Data Record Transfer Request and the Data Record Transfer Response are messages used when CDRs are transmitted, and they are the core content of the GTP'.

Specifically, the structure of the Data Record Transfer Request is as shown in Table 1, it may include the following five Information Elements (IEs):

1. Packet Transfer Command;
2. Data Record Packet;
3. Sequence Numbers of Released Packets;
4. Sequence Numbers of Cancelled Packets; and
5. Private Extension.

TABLE 1

| Information Element | Presence requirement |
|---|---|
| Packet Transfer Command | Mandatory |
| Data Record Packet | Conditional |
| Sequence Numbers of Released Packets | Conditional |
| Sequence Numbers of Cancelled Packets | Conditional |
| Private Extension | Optional |

Wherein the Packet Transfer Command is a mandatory parameter, and currently it has the following four values:

1) 1='Send Data Record Packet':

Then, an IE, namely, Data Record Packet is mandatory, and the structure of the IE is as shown in Table 2.

TABLE 2

| Class | Octets | Data | Note |
|---|---|---|---|
| IE-T | 1 | Type = 252 | Indicating IE-Data Record Packet |
| IE-L | 2 . . . 3 | Length | when Length == 0, indicating that a NULL packet is sent |
| IE-V | 4 | Number of Data Records | |
| | 5 | Data Record Format | 1: BER, 2: PER(unaligned), 3: PER(aligned) |
| | 6 . . . 7 | Data Record Format Version | |
| | 8 . . . 9 | Length of Data Record 1 | |
| | 10 . . . n | Data Record 1 | |
| | . . . | | |
| | x . . . x + 1 | Length of Data Record N | |
| | x + 2 . . . y | Data Record N | |

2) 2='Send possibly duplicated Data Record Packet':

Then, an IE, namely, Data Record Packet is mandatory, and the structure of the IE is as shown the aforementioned Table 2.

When there are multiple CGFs in the current network, due to a network malfunction of CGF1, a Data Record Packet sent by a GPRS Supported Node (GSN) to CGF1 is not responded in time, then the GSN may send a same Data Record Packet, in the form of a command 'Send possibly duplicated Data Record Packet', to CGF2 (standby CGF); after receiving such a data packet, CGF2 will temporarily cache it locally, and it is not until CGF2 receives a command 'Cancel/Release Data Record Packet' from a data packet corresponding to the GSN that the CGF2 may delete the possibly duplicated Data Record Packet cached locally (Cancel) or release the possibly duplicated Data Record Packet to a normal data record directory.

3) 3='Cancel Data Record Packet':

Then, an IE, namely, Sequence Numbers of Cancelled Packets is mandatory, and the structure of the IE is as shown in Table 3.

TABLE 3

| Class | Octets | Data | Note |
|---|---|---|---|
| IE-T | 1 | Type = 250 | Indicating IE-Sequence No Cancel |
| IE-L | 2 . . . 3 | Length | |
| IE-V | 4 . . . 5 | Sequence Number 1 | |
| | n . . . n + 1 | Sequence Number N | |

4) 4='Release Data Record Packet':

Then, an IE, namely, Sequence Numbers of Released Packets is mandatory, and the structure of the IE is as shown in Table 4.

TABLE 4

| Class | Octets | Data | Note |
|---|---|---|---|
| IE-T | 1 | Type = 249 | Indicating IE-Sequence No Release |
| IE-L | 2 . . . 3 | Length | |
| IE-V | 4 . . . 5 | Sequence Number 1 | |
| | n . . . n + 1 | Sequence Number N | |

A Data Record Transfer Response message is used by CGF to respond to a Data Record Transfer Request message, and the structure of the message Data Record Transfer Response is as shown in Table 5.

TABLE 5

| Information Element | Presence requirement |
|---|---|
| Cause | Mandatory |
| Requests Responded | Mandatory |
| Private Extension | Optional |

This message must include two types of IEs: Cause and Requests Responded, wherein the Cause represents a response result (the reason for reception or rejection); and the Requests Responded represents the sequence number of a successfully-received Data Record Packet, the structure of which is as shown in Table 6, the IE can include sequence numbers of multiple Data Record Packets, that is to say, one Data Record Transfer Response message can respond to multiple Data Record Transfer Requests.

TABLE 6

| Class | Octets | Data | Note |
|---|---|---|---|
| IE-T | 1 | Type = 253 | Indicating IE-Sequence Responded |
| IE-L | 2 . . . 3 | Length | |
| IE-V | 4 . . . 5 | Sequence Number 1 | |
| | n . . . n + 1 | Sequence Number N | |

Data Record Packet transmission methods in GTP' include the following three cases:

Case 1, Data Record Packet transmission is implemented in normal circumstances, and the transmission process is as shown in FIG. 4, which mainly includes the following steps:

Step 401: A GSN sends a Data Record Packet to a CGF, and the corresponding message is a Data Record Transfer Request, wherein the Packet Transfer Command parameter is Send Data Record Packet, and the sequence number in the message header is N.

Step 402: The CGF receives and processes the message, and stores locally the data record included in the Data Record Packet.

Step 403: The CGF sends a response message to the GSN, and the message content is a Data Record Transfer Response, wherein the Requests Responded parameter includes the sequence number N, and the Cause parameter is set to Request Accepted.

Step 404: After receiving the Data Record Transfer Response message, the GSN deletes from the cache the Data Record Packet with a sequence number of N.

If failing to receive a response, the GSN may resend the request within a specified interval and for a preset number of times.

Case 2, a GSN and CGF1 is disconnected, and the transmission process is as shown in FIG. 5, which mainly includes the following steps:

Step 501: A GSN sends a Data Record Transfer Request message to CGF1 (primary CGF), wherein the Packet Transfer Command parameter is Send Data Record Packet, and the sequence number of the message header is M.

Step 502: Since the GSN loses communications with CGF1, CGF1 does not receive a Data Record Packet.

Step 503: The GSN cannot receive a response.

Step 504: The GSN detects (by Echo Request) its link with CGF2 (standby CGF), and if the link is normal, the GSN sends, the same Data Record Packet as sent to CGF1, to CGF2 by the Data Record Transfer Request message, wherein the Packet Transfer Command parameter is Send possibly duplicated Data Record Packet, and the sequence number in the message header is N.

Step 505: CGF2 receives and processes the Data Record Packet, since the Data Record Packet is identified as possibly duplicated, CGF2 only caches the Data Record Packet, and does not immediately send it to a Billing system (BS).

Step 506: CGF2 sends a correct reception acknowledgement message to the GSN by a Data Record Transfer Response message, wherein the Requests Responded parameter includes the sequence number N, and the Cause parameter is set to Request Accepted.

Step 507: The GSN can delete the Data Record Packet successfully sent (which may be duplicated), but still retain the sequence numbers of the Data Record Packet sent to CGF1 and CGF2 (i.e., M and N).

Step 508: After being recovered, CGF1 sends a Node Alive Request message to the GSN, and the GSN learns that it can communicate with CGF1.

Step 509: The GSN acknowledges by a Node Alive Response message.

Step 510: For the Data Record Transfer Request message not acknowledged above (in Step 501), the GSN sends a null testing Data Record Packet to CGF1, and the null Data Record Packet is a packet in which only data of data records is not included in the Data Record Packet parameter and others remain the same (the sequence number in the message header is still M).

Step 511: CGF1 responds with a Data Record Transfer Response message, wherein the Requests Responded parameter includes the sequence number M, and the Cause parameter is set to Request Accepted. Since the GSN has already lost contact with CGF1, CGF1 does not receives any Data Record Packet, and thus CGF1 regards the testing Data Record Packet as a new one and can accept it.

Step 512: After receiving a response message from CGF1, the GSN learns that CGF1 does not process the testing Data Record Packet, and notifies CGF2 that it can send the testing Data Record Packet to the BS, the message adopted is a Data Record Transfer Request, and the Packet Transfer Command parameter is Release Data Record Packet. The Sequence Numbers of the Released Packets parameter includes the sequence number N.

Step 513: CGF2 sends the Data Record Packet to the BS.

Step 514: CGF2 sends a Data Record Transfer Response message to the GSN, where the Requests Responded parameter includes the sequence number N, and the Cause parameter is set to Request Accepted.

Case 3, a link between a GSN and CGF1 is disconnected after a Data Record Packet is correctly received, and the transmission process is as shown in FIG. 6, which mainly includes the following steps:

Step 601: A GSN sends a Data Record Transfer Request message to CGF1 (primary CGF), wherein the Packet Transfer Command parameter is Send Data Record Packet, and the sequence number of the message header is M.

Step 602: After receiving the Data Record Packet, CGF1 store safely the data records included in the Data Record Packet.

Step 603: The communications between the GSN and CGF1 is interrupted, and the GSN cannot receive a response from CGF1.

Step 604: The GSN detects (by Echo Request) its link with a standby CGF (CGF2), if the link is normal, the GSN sends, the same CDR as sent to CGF1, to CGF2 by the Data Record Transfer Request message, wherein the Packet Transfer Command parameter is Send possibly duplicated Data Record Packet, and the sequence number in the message header is N.

Step 605: CGF2 receives and processes the Data Record Packet, since the Data Record Packet is identified as possibly duplicated, CGF2 only caches the Data Record Packet, and does not immediately send it to the BS.

Step 606: CGF2 sends a correct reception acknowledgement message to the GSN by a Data Record Transfer Response message, wherein the Requests Responded parameter includes the sequence number N, and the Cause parameter is set to Request Accepted.

Step 607: The GSN can delete the Data Record Packet successfully sent (which may be duplicated), but still retain the sequence numbers of the Data Record Packet sent to CGF1 and CGF2 (i.e., M and N).

Step 608: After being recovered, CGF1 sends a Node Alive Request message to the GSN, and the GSN learns that it can communicate with CGF1.

Step 609: The GSN acknowledges by a Node Alive Response message.

Step 610: For the Data Record Transfer Request message not acknowledged above (in Step 601), the GSN sends a null testing Data Record Packet to CGF1, and the null Data Record Packet is a packet in which only data of data records is not included in the Data Record Packet parameter and others remain the same (the sequence number in the message header is still M).

Step 611: CGF1 responds with a Data Record Transfer Response message, wherein the Requests Responded parameter includes the sequence number M, and the Cause parameter is set to Request related to possibly duplicated packets already fulfilled. Since CGF1 stored the Data Record Packets before losing communications with the GSN, CGF1 considers the testing Data Record Packet as duplicated.

Step 612: After receiving a response message from CGF1, the GSN learns that CGF1 has received and stored the Data Record Packet, and notifies CGF2 to cancel the Data Record Packet, the message adopted is Data Record Transfer Request, and the Packet Transfer Command parameter is Cancel Data Record Packet. Wherein the Sequence Numbers of the Released Packets parameter includes the sequence number N.

Step 613: CGF2 deletes the Data Record Packet from the cache.

Step 614: CGF2 sends a Data Record Transfer Response message to the GSN, wherein the Requests Responded parameter includes the sequence number N, and the Cause parameter is set to Request Accepted.

The existing transmission methods have the following problems:

When CGF1 is interrupted for a period of time, the GSN sends possibly duplicated packets to CGF2. Assuming that the sequence numbers of the possibly duplicated packets are from M to N, since CGF1 is interrupted, the possibly duplicated packets will not be processed temporarily; the current network speed is general high, supposing the traffic volume is up to 10000/s and each data packet only stores one data record, the sequence number will reach M again within less than seven seconds (since the maximum sequence number is 65535); then if a further Data Record Packet is desired to be sent, the sequence numbers from M to N must be bypassed, that is to say, after a new sequence number reaches M−1, the sequence number of the next Data Record Packet is not M but N+1; otherwise, after the CGF responds to packets with the sequence numbers from M to N, the GSN cannot judge whether the sequence number of the possibly duplicated packet or the normal packet is responded. Though the above problem can be solved by bypassing the sequence numbers from M to N, a situation in which the quantity of available sequence numbers is reduced will be resulted in, supposing an Echo Request is sent every 3 seconds and a link is considered as disconnected only when an Echo Response is not received for three consecutive times, the GSN will not learn, within 9 seconds, that its link with CGF1 is disconnected, instead, the GSN will send consecutively 65535 Data Record Packets to CGF1, but CGF1 can respond to none of them, so that the possibly duplicated packets will exhaust all the sequence number resources, thus resulting in the GSN not being able to communicate normally with CGF2. It should be noted that even if the number of the possibly duplicated packets sent by the GSN to CGF2, due to and after the disconnection between the GSN and CGF1, does not reach 65535, and if subsequent disconnections between the GSN and CGF3 or other CGFs result in accumulation of possibly duplicated packets between GSN and CGF2, it will eventually result in the situation in which sequence number resources between the GSN and CGF2 are exhausted. The above process is shown in FIG. 7, and the procedures are described as follows.

Step 701: A GSN sends consecutively multiple packets to CGF1, the sequence numbers are from X to Y.

Step 702: CGF1 is in essence interrupted.

Step 703: CGF1 does not give any response to the GSN.

Step 704: The GSN learns that its link with CGF1 is interrupted, and redirects to CGF2.

Step 705: The GSN sends possibly duplicated packets with the sequence numbers from X to Y to CGF2, and the sequence numbers correspond to sequence numbers from M to N of CGF2.

Step 706: The GSN constantly sends new data records to CGF2, resulting in sequence numbers of new Data Record Packets back to M−1.

Step 707: If a next Data Record Packet is desired to be sent, the sequence number must bypass M to N, i.e., the sequence number of the next Data Record Packet is N+1.

In addition, there is another case in the prior art: the protocol enables the CGF to manually release/delete possibly duplicated packets, but after the CGF releases/deletes the possibly duplicated packets, the GSN does not learn of that, and the GSN still maintain these possibly duplicated packets manually released/deleted by the CGF (including sequence numbers), this will result in that possibly duplicated packets maintained by the GSN become more and more, and when the numbers of possibly duplicated packets maintained by the GSN is close to 65535, communication cannot be proceeded any more, thereby bringing great hidden dangers to the stability of a program.

It can be seen that the above case in which possibly duplicated packets occupy a great amount of sequence number resources hardly happens when the traffic volume is relatively small, thus the above problem may also be solved if the quantity of Data Record Packets sent within a unit time is limited, but this will also limit the data transmission rate in normal circumstances and waste a great amount of bandwidth. If the range of sequence numbers is extended alone, such as being extended from WORD to DWORD, first comes the problem of protocol compatibility, and the problem of duplication of possibly duplicated packets and normal packets cannot be solved neither (since for a rate of 10000/s, sequence numbers of DWORD will also duplicate after the interruption of CGF1 for 120 hours).

At present, the development of hardware is rapid, and service providers have higher and higher requirements on the transmission rate of data records, it is a moderate requirement for the data record processing rate to exceed 10000/s, thus in order to solve the above problem, a method, which does not limit network transmission rate and in the mean time can solve the problem that possibly duplicated packets occupy sequence number resources, must be found; however, the prior art cannot provide solutions meeting the above requirements.

SUMMARY

In view of the above, embodiments of the disclosure are intended to provide a method and system for processing a Data Record Packet, so as to solve, in the case of not limiting network transmission rate, the problem that possibly duplicated packets occupy sequence number resources.

To this end, the technical solutions of the disclosure are implemented as follows.

The embodiment of the disclosure provides a method for processing a Data Record Packet, the method includes:

a General Packet Radio Service Supported Node (GSN) sends the Data Record Packet to a Charging Gateway Function (CGF), wherein the Data Record Packet is a normal packet or a possibly duplicated packet, and the message header of a message for sending Data Record Packet includes a sequence number and the message body includes packaging time; and the CGF sends a response message of receiving the Data Record Packet to the GSN, wherein the Packet Transfer Response Command information element in the response message is used to indicate whether the response message is for the normal packet or the possibly duplicated packet.

The method further includes:

the GSN maintains a packaging time list of the Data Record Packet corresponding to the sequence number, wherein each packaging time in the packaging time list is sorted in chronological order; and before the Data Record Packet is packaged, the GSN judges whether the number of packaging time in the packaging time list corresponding to a sequence number to be used is larger than a preset threshold, and if it is larger, the GSN stops packaging; otherwise, the GSN continues packaging, and sends the packaged Data Record Packet to the CGF, wherein the message header of a message for sending Data Record Packet includes the sequence number to be used and the message body includes the packaging time of the Data Record Packet.

The method further includes:

after receiving a Send Data Record Packet message from the GSN, the CGF compares the packaging time of the Data Record Packet with packaging time in a packaging time list maintained locally by the CGF and corresponding to the same sequence number as the sequence number of the Data Record Packet, and if there is same packaging time as the packaging time of the Data Record Packet in the packaging time list maintained locally by the CGF, the CGF discards the Data Record Packet; otherwise, the CGF receives the Data Record Packet.

After the Data Record Packet is received, the method further includes:

the CGF judges whether the number of the packaging time in the packaging time list maintained locally is larger than/equal to a preset threshold, and if so, the CGF deletes the earliest packaging time in the packaging time list, and adds a newly-received packaging time into the packaging time list; otherwise, adds directly the new-received packaging time into the packaging time list.

The method further includes:

under the control of a network administrator, the CGF deletes or releases the possibly duplicated packet cached by the CGF itself, and sends a Delete possibly duplicated Packet Sequence Number Request message to the GSN, wherein the message body includes the sequence number and packaging time of the deleted possibly duplicated packet;

after receiving the Delete possibly duplicated Packet Sequence Number Request message, the GSN looks up whether there is a sequence number and packaging time corresponding to the possibly duplicated packet, and if there is, the GSN deletes the packaging time corresponding to the sequence number of the possibly duplicated packet, and responds to the CGF with a Delete possibly duplicated Packet Sequence Number Response message.

After the GSN deletes the packaging time under the sequence number corresponding to the possibly duplicated packet, the method further includes:

if the possibly duplicated packet has been sent to other CGFs, the GSN notifies the other CGFs to delete the packaging time under the sequence number corresponding to the possibly duplicated packet; and after deleting the packaging time under the sequence number corresponding to the possibly duplicated packet, the other CGFs respond to the GSN, wherein the Packet Transfer Response Command information element in the response message is used to indicate that the sequence number of the possibly duplicated packet is responded.

The embodiment of the disclosure further provides a system for processing a Data Record Packet, and the system includes a General Packet Radio Service Supported Node (GSN) and a Charging Gateway Function (CGF), wherein the GSN is configured to send the Data Record Packet to the CGF, wherein the Data Record Packet is a normal packet or a possibly duplicated packet, and the message header of a message for sending Data Record Packet includes a sequence number and the message body includes packaging time; and the CGF is configured to receive the Data Record Packet sent by the GSN and send a response message of receiving the Data Record Packet to the GSN, wherein the Packet Transfer Response Command information element in the response message is used to indicate whether the response message is for the normal packet or the possibly duplicated packet.

The GSN is further configured to: maintain a packaging time list of the Data Record Packet corresponding to the sequence number, wherein each packaging time in the packaging time list is sorted in chronological order; and before the Data Record Packet is packaged, judge whether the number of packaging times in the packaging time list corresponding to a sequence number to be used is larger than a preset threshold, and if it is larger, stop packaging; otherwise, continue packaging, and send the packaged Data Record Packet to the CGF, wherein the message header of a message for sending Data Record Packet includes the sequence number to be used and the message body includes the packaging time of the Data Record Packet.

The CGF is further configured to: after receiving a Send Data Record Packet message from the GSN, compare the packaging time of the Data Record Packet with packaging time in a packaging time list maintained locally by the CGF and corresponding to a same sequence number as the sequence number of the Data Record Packet, and if there is same packaging time as the packaging time of the Data Record Packet in the packaging time list maintained locally by the CGF, discard the Data Record Packet; otherwise, receive the Data Record Packet.

The CGF is further configured to: after the Data Record Packet is received, judge whether the number of the packaging time in the packaging time list maintained locally is larger than/equal to a preset threshold, and if so, delete the earliest packaging time in the packaging time list, and add a newly-received packaging time into the packaging time list; otherwise, add directly the new-received packaging time into the packaging time list.

The CGF is further configured to delete or release, under the control of a network administrator, the possibly duplicated packet cached by the CGF itself, and send a Delete possibly duplicated Packet Sequence Number Request message to the GSN, wherein the message body includes the sequence number and packaging time of the deleted possibly duplicated packet;

accordingly, after receiving the Delete possibly duplicated Packet Sequence Number Request message, the GSN looks up whether there is a sequence number and packaging time corresponding to the possibly duplicated packet, and if there is, the GSN deletes the packaging time under the sequence number corresponding to the possibly duplicated packet, and responds to the CGF with a Delete possibly duplicated Packet Sequence Number Response message.

The GSN is further configured to: after deleting the packaging time under the sequence number corresponding to the possibly duplicated packet, if the possibly duplicated packet has been sent to other CGFs, notify the other CGFs to delete the packaging time under the sequence number corresponding to the possibly duplicated packet;

accordingly, after deleting the packaging time under the sequence number corresponding to the possibly duplicated packet, the other CGFs respond to the GSN, wherein the Packet Transfer Response Command information element in the response message is used to indicate that the sequence number of the possibly duplicated packet is responded.

The embodiment of the disclosure further provides a method for processing a Data Record Packet, and the method includes:

under the control of a network administrator, a Charging Gateway Function (CGF) deletes or releases a possibly duplicated packet cached by the CGF itself, and sends a Delete possibly duplicated Packet Sequence Number Request message to a General Packet Radio Service Supported Node (GSN), wherein the message body includes the sequence number of the deleted possibly duplicated packet; and after receiving the Delete possibly duplicated Packet Sequence Number Request message, the GSN looks up whether there is a sequence number corresponding to the possibly duplicated packet, and if there is, the GSN deletes the sequence number corresponding to the possibly duplicated packet, and responds to the CGF with a Delete possibly duplicated Packet Sequence Number Response message.

After the GSN deletes the sequence number corresponding to the possibly duplicated packet, the method further includes:

if the possibly duplicated packet has been sent to other CGFs, the GSN notifies the other CGFs to delete the sequence number corresponding to the possibly duplicated packet; and after deleting the packaging time under the sequence number corresponding to the possibly duplicated packet, the other CGFs respond to the GSN.

The embodiment of the disclosure further provides a system for processing a Data Record Packet, and the system includes a GSN and a CGF, wherein the CGF is configured to delete or release, under the control of a network administrator, the possibly duplicated packet cached by the CGF itself, and send a Delete possibly duplicated Packet Sequence Number Request message to the GSN, wherein the message body includes the sequence number of the deleted possibly duplicated packet; and the GSN is configured to: after receiving the Delete possibly duplicated Packet Sequence Number Request message, look up whether there is a sequence number corresponding to the possibly duplicated packet, and if there is, delete the sequence number corresponding to the possibly duplicated packet, and respond to the CGF with a Delete possibly duplicated Packet Sequence Number Response message.

The GSN is further configured to: after deleting the sequence number corresponding to the possibly duplicated packet, if the possibly duplicated packet has been sent to other CGFs, notify the other CGFs to delete the sequence number corresponding to the possibly duplicated packet;

accordingly, after deleting the sequence number corresponding to the possibly duplicated packet, the other CGFs respond to the GSN.

A method and system for processing a Data Record Packet provided by embodiments of the disclosure, distinguish whether a response message is for a normal packet or a possibly duplicated packet through the Packet Transfer Response Command information element in the response message of the Data Record Packet, in this way, separated maintenances of sequence numbers of the normal packet and the possibly duplicated packet can be implemented, so that the transmission process of the Data Record Packet can be more clear, more importantly, since the sequence numbers of the normal packet and the possibly duplicated packet are maintained separately, long term occupation of the sequence numbers of the possibly duplicated packet will not affect the transmission of the normal Data Record Packet.

A Data Record Packet transmission based on a sequence number+packaging time can judge more accurately which Data Record Packets are transmitted successfully, to eventually implement that a GSN may send maximum 65535 Data Record Packets to a CGF within one second, thereby utilizing a network transmission capability to the most extent.

When deleting/releasing a possibly duplicated Data Record Packet is implemented in a CGF side, a Delete possibly duplicated Packet Sequence Number Request message sent from a CGF to a GSN and a Delete possibly duplicated Packet Sequence Number Response message sent from the GSN to the CGF are added for eliminating packaging time corresponding to the sequence number of a possibly duplicated packet left in the GSN side; in this way, not only packaging time resources corresponding to the sequence number of the possibly duplicated packet may be effectively released in the GSN side, but also the GSN may be prevented from sending a Release possibly duplicated packet Command to other CGFs, thus avoiding the other CGFs to release a same possibly duplicated packet to a billing center.

DETAILED DESCRIPTION

The technical solutions of the disclosure will be further elaborated with reference to the accompanying drawings and specific embodiments.

A method for processing a Data Record Packet provided by embodiments of the disclosure mainly includes: a GSN sends the Data Record Packet to a CGF, wherein the Data Record Packet is a normal packet or a possibly duplicated packet, and the message header of a message for sending the Data Record Packet includes a sequence number, and the message body includes packaging time; and the CGF sends a response message of receiving the Data Record Packet to the GSN, wherein the Packet Transfer Response Command information element in the response message is used to indicate whether the response message is for the normal packet or the possibly duplicated packet.

The Packet Transfer Response Command information element is used to distinguish whether the response message is for a normal packet or a possibly duplicated packet, in this way, separated maintenances of sequence numbers of the normal packet and the possibly duplicated packet can be implemented, so that the transmission process of the Data Record Packet can be more clear, more importantly, since the sequence numbers of the normal packet and the possibly duplicated packet are maintained separately, long term occupation of the sequence numbers of the possibly duplicated packet will not affect the transmission of the normal Data Record Packet.

The implementation of separated maintenances of sequence numbers of the normal Data Record Packet and the possibly duplicated Data Record Packet is described as follows.

In a Data Record Transfer Response message sent from the CGF to the GSN, an IE, namely, Packet Transfer Response Command, is added, the structure of the IE is as shown in Table 7.

TABLE 7

| Octets | Data | Note |
| --- | --- | --- |
| 1 | Type = 125 | Indicating IE-Packet Transfer Response Command |
| 2 | Value = 1 . . . 2 | Packet Transfer Response Command |

In the above table, Packet Transfer Response Command=1 indicates a Response for Data Record Packet, and Packet Transfer Response Command=2 indicates a Response for possibly duplicated Data Record Packet. The IE-Packet Transfer Response Command is used to distinguish whether the Data Record Packet responded is a possibly duplicated packet or a normal packet, in this way, the separated maintenances of sequence numbers of the normal packet and the possibly duplicated packet can be implemented.

The structure of a new Data Record Transfer Response message added with the IE-Packet Transfer Response Command is as shown in Table 8.

TABLE 8

| Information Element | Presence requirement |
| --- | --- |
| Cause | Mandatory |
| Packet Transfer Response Command | Conditional |
| Requests Responded | Conditional |
| Sequence Numbers of Packets With Time | Conditional |
| Private Extension | Optional |

Figure 1:
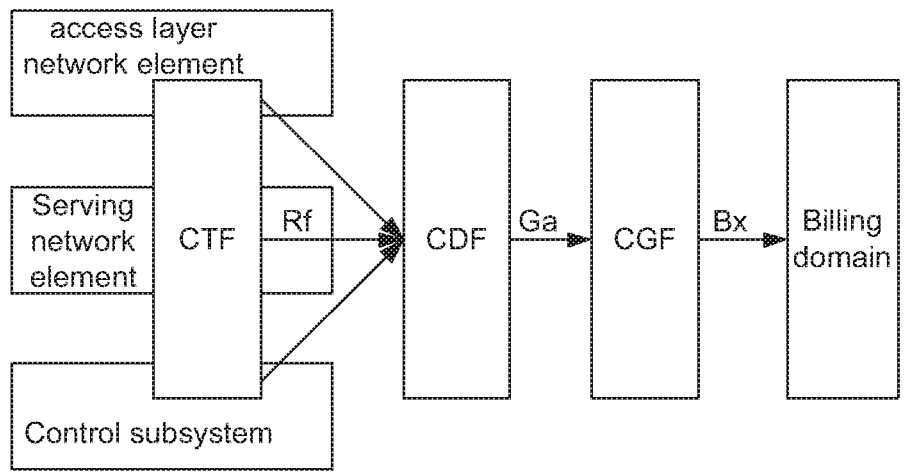
FIG. 1 is a schematic diagram showing the relationship between CTF, CDF and CGF in a current 3GPP network.
Figure 2:
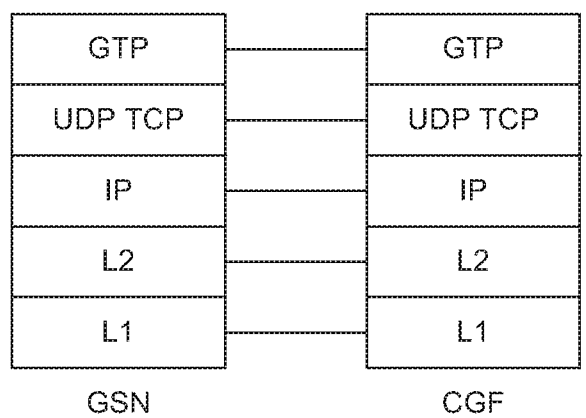
FIG. 2 is a schematic diagram showing hosting situations of a current GTP'.
Figure 3:
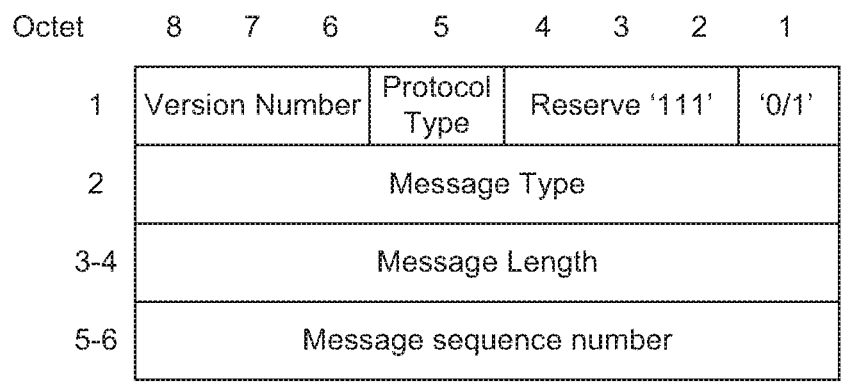
FIG. 3 is a schematic diagram of the structure of a message header of a current GTP'.
Figure 4:
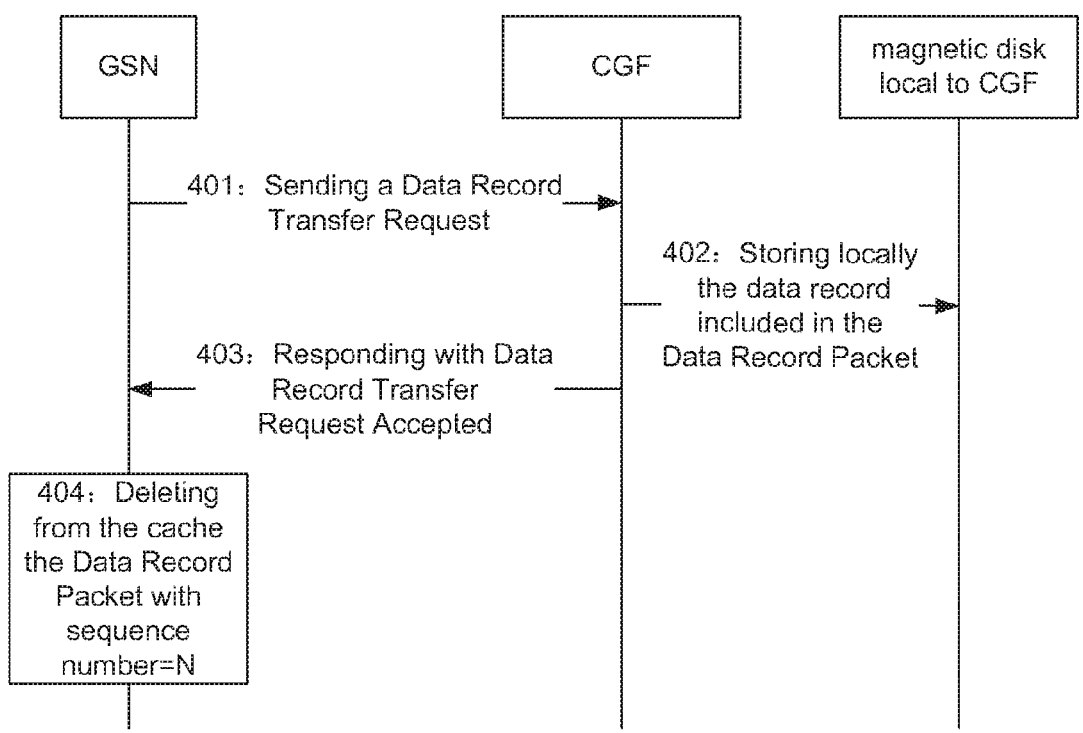
FIG. 4 is a schematic diagram of a Data Record Packet transmission in normal circumstances according to the prior art.
Figure 5:
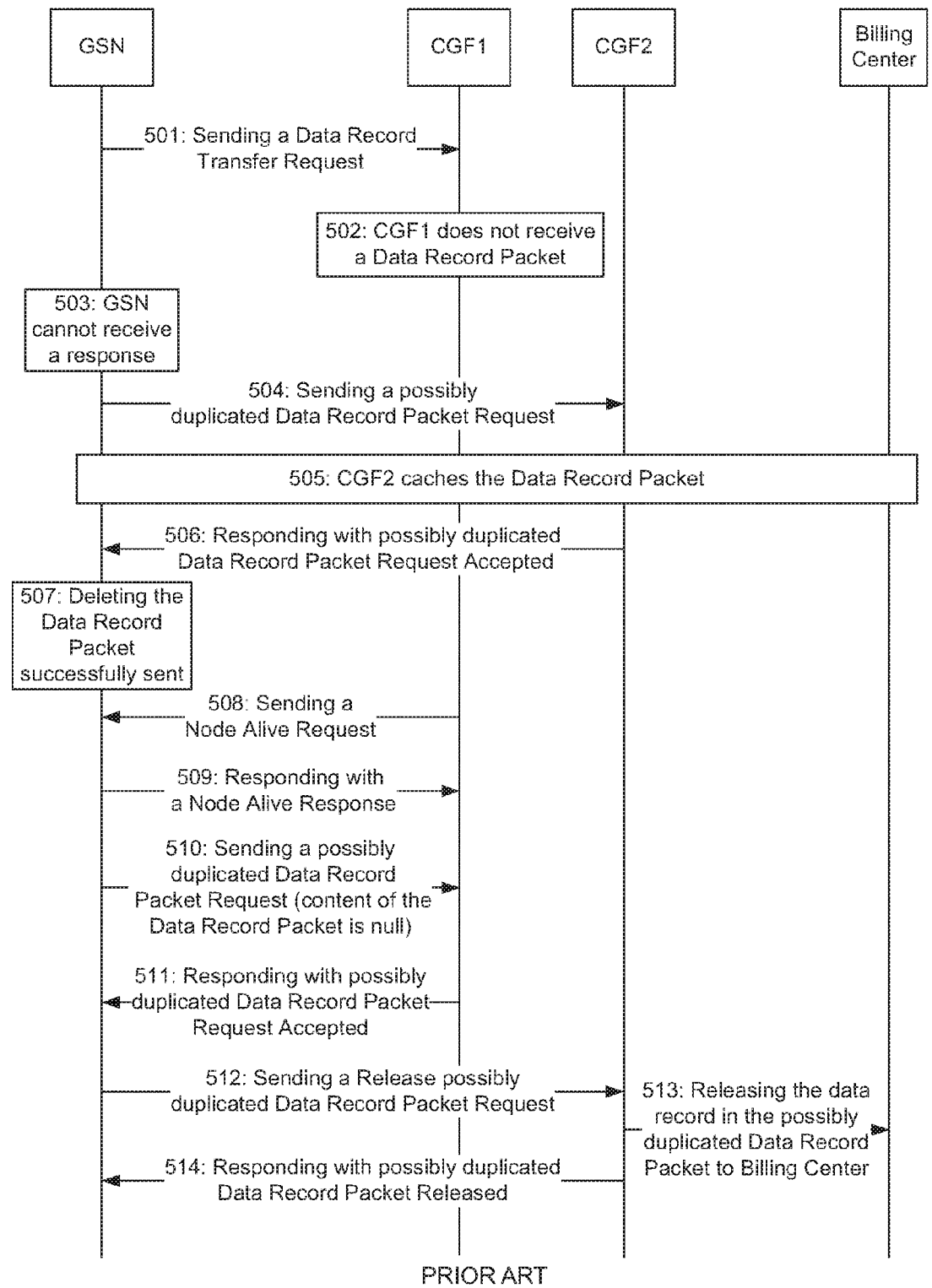
FIG. 5 is a schematic diagram of a transmission process in the case that the connection between a GSN and CGF1 is interrupted before a Data Record Packet is not yet correctly received according to the prior art.
Figure 6:
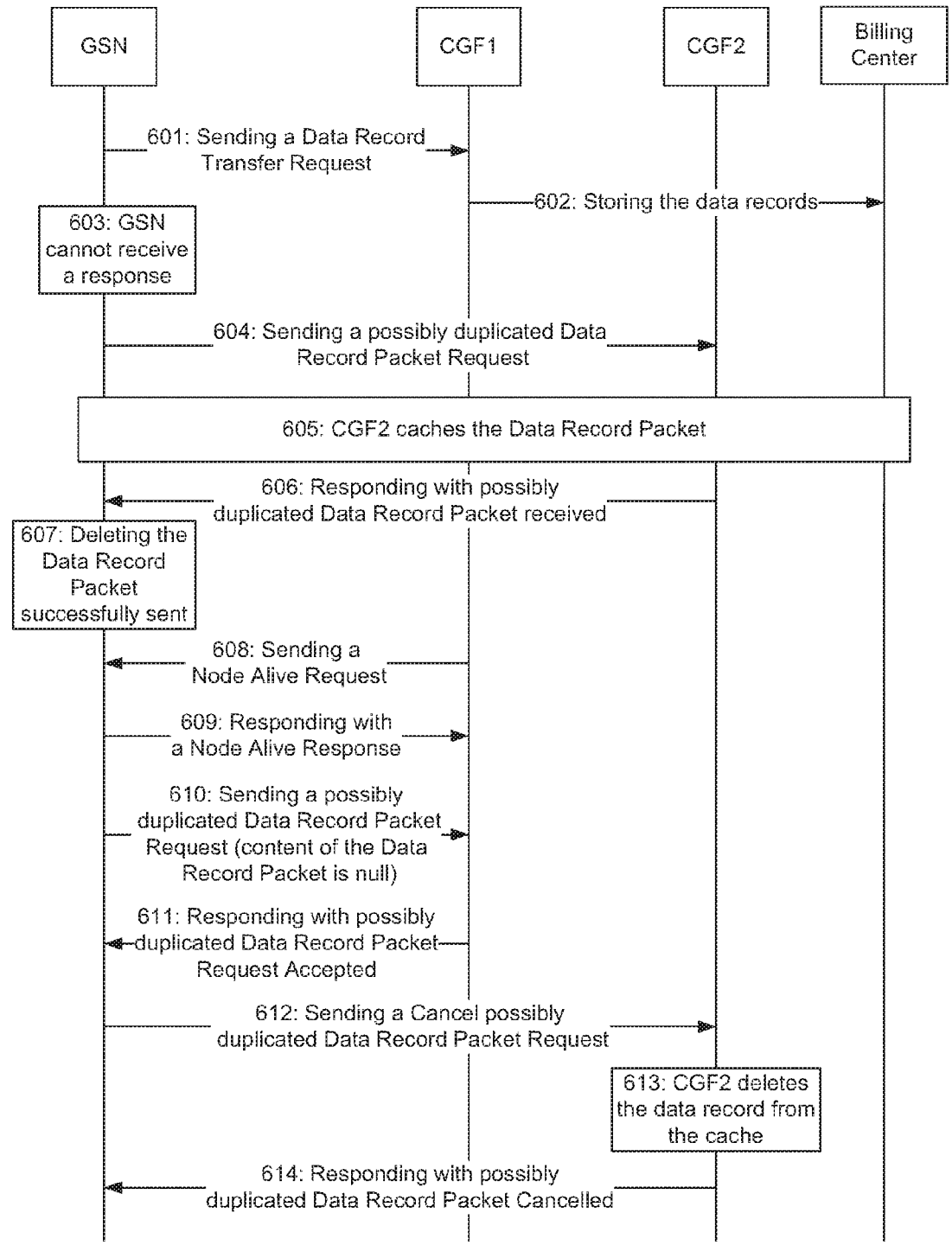
FIG. 6 is a schematic diagram of a transmission process in the case that the connection between a GSN and CGF1 is interrupted after a Data Record Packet is already correctly received according to the prior art.
Figure 7:
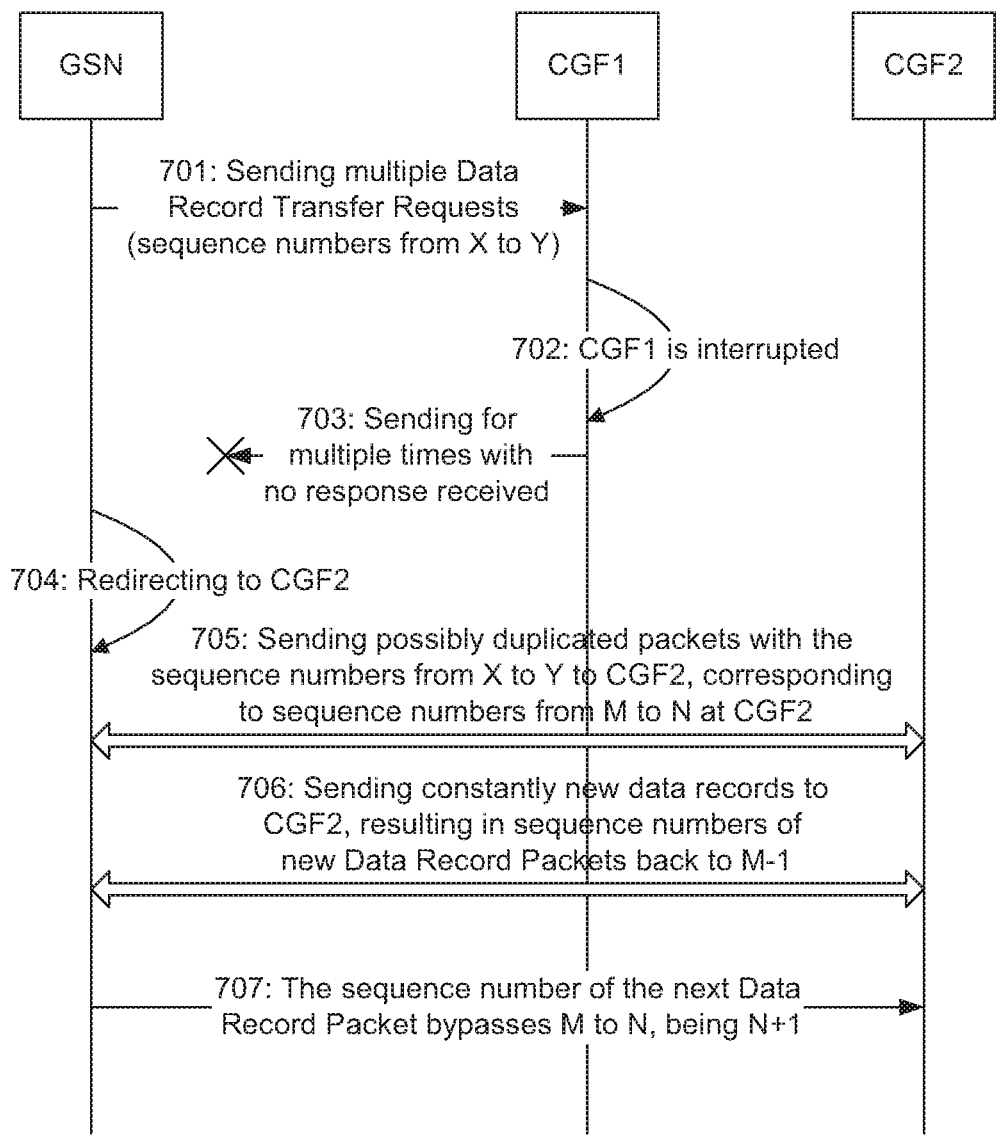
FIG. 7 is a schematic diagram of a transmission process in the case that the sequence numbers of normal Data Record Packets bypass the sequence numbers of possibly duplicated packets according to the prior art.
Figure 8:
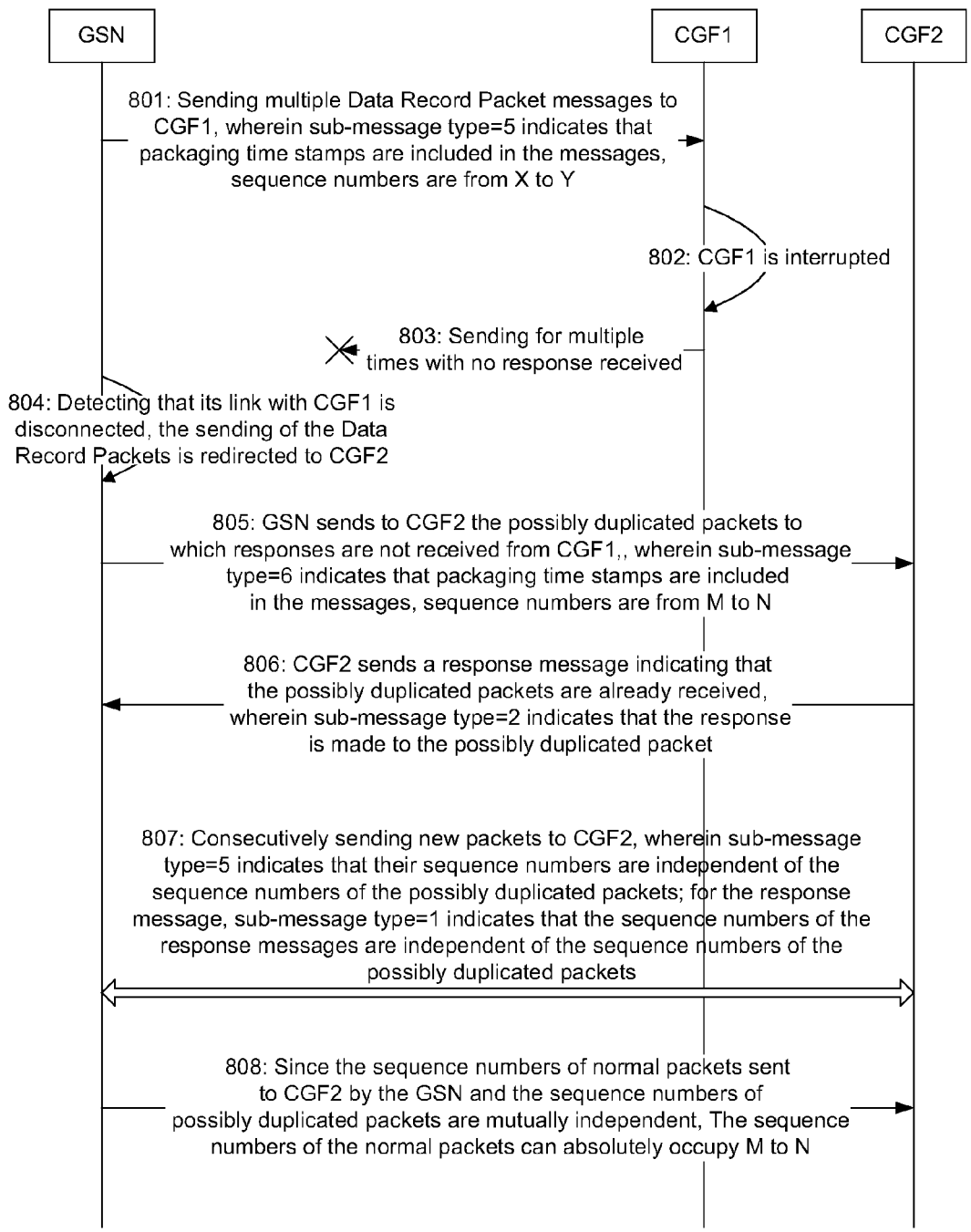
FIG. 8 is a flowchart of a method for processing a Data Record Packet according to embodiments of the disclosure.

As shown in FIG. 8, the flow of processing a Data Record Packet includes:

Step 801: A GSN sends multiple Data Record Packet messages to CGF 1 (primary CGF), and the message sent is a Data Record Transfer Request.

For example, Packet Transfer Command=5 indicates a Send Data Record Packet With Time, and sequence numbers sent to CGF1 are from X to Y.

Step 802: CGF1 is in essence interrupted.

Step 803: The GSN attempts multiple times to resend the Data Record Packets with the sequence numbers from X to Y to CGF1, but CGF1 does not give any response to the GSN.

Step 804: The GSN detects that its link with CGF1 is disconnected, and redirects the sending of the Data Record Packets to CGF2 (standby CGF).

Step 805: The GSN sends the possibly duplicated packets, to which responses are not received from CGF1, to CGF2, and the message sent is the Data Record Transfer Request.

For example, Packet Transfer Command=6 indicates a Send possibly duplicated Data Record Packet With Time, and sequence numbers sent to CGF2 are from M to N (since then at this point Packet Transfer Command=6, the sequence numbers from M to N may be independent of sequence numbers of normal Data Record Packets).

Step 806: CGF2 sends a response message indicating that the possibly duplicated packets are already received, the message sent is a Data Record Transfer Response.

For example, Packet Transfer Response Command=2 indicates a Response for possibly duplicated Data Record Packet, so that the GSN may judge that the response message is directed to the possibly duplicated packets, thus achieving complete independence of the sequence numbers of normal packets. Because in a response message to a normal packet, Packet Transfer Response Command=1, while in a response message to a possibly duplicate packet, Packet Transfer Response Command=2; response messages to normal packets and to possibly duplicated packets can be distinguished by the Packet Transfer Response Command, and thus sequence numbers of the normal packets and sequence numbers of the possibly duplicated packets can be used completely independently.

Step 807: The GSN consecutively sends new packets to CGF2, the message sent is the Data Record Transfer Request, if Packet Transfer Command=5, their sequence numbers are independent of the sequence numbers of the possibly duplicated packets; the response message from CGF2 is the Data Record Transfer Response; and if Packet Transfer Response Command=1, the responded sequence numbers are independent of the sequence numbers of the possibly duplicated packets.

Step 808: Since the sequence numbers of normal packets sent to CGF2 by the GSN and the sequence numbers of possibly duplicated packets sent to CGF2 by the GSN are mutually independent (because for the normal packets sent to CGF2 by the GSN, Packet Transfer Command=5, while for the possibly duplicated packets, Packet Transfer Command=6, it can be distinguished whether those sent to CGF2 by the GSN are normal packets or possibly duplicated packets by the Packet Transfer Command. Thus sequence numbers of the normal packets and sequence numbers of the possibly duplicated packets can be used completely independently), the sequence numbers of the normal packets can absolutely occupy M to N.

Based on the embodiment of the above method, in order to exploit network transmission performance, the embodiment of the disclosure expands, when the GSN sends the Data Record Transfer Request to the CGF, the definition of the IE: Packet Transfer Command, for indicating that the data packets sent include packaging time, and the structure of expanded Data Record Transfer Request message is as shown in Table 9.

TABLE 9

| Information Element | Presence requirement |
|---|---|
| Packet Transfer Command | Mandatory |
| Data Record Packet | Conditional |
| Sequence Numbers of Released Packets | Conditional |
| Sequence Numbers of Cancelled Packets | Conditional |
| Data Record Packet With Time | Conditional |
| Sequence Numbers of Released Packets With Time | Conditional |

TABLE 9-continued

| Information Element | Presence requirement |
|---|---|
| Sequence Numbers of Cancelled Packets With Time | Conditional |
| Private Extension | Optional |

In addition, an IE: Data Record Packet With Time is added into the message, and its structure is as shown in Table 10.

TABLE 10

| Class | Octets | Data | Note |
|---|---|---|---|
| IE-T | 1 | Type = 248 | Indicating IE-Data Record Packet With Time |
| IE-L | 2 . . . 3 | Length | when Length == 0, indicating that a NULL packet is sent |
| IE-V | 3 . . . 6 | DWORD TIME | Indicating that packaging UTC time begins from Jan. 1st, 1970 |
| | 7 | Number of Data Records | Indicating the number of data records (1 . . . N) |
| | 8 | Data Record Format | 1: BER, 2: PER(unaligned), 3: PER(aligned) |
| | 9 . . . 10 | Data Record Format Version | |
| | 11 . . . 12 | Length of Data Record 1 | |
| | 13 . . . n | Data Record 1 | |
| | . . . | | |
| | x . . . x + 1 | Length of Data Record N | |
| | x + 2 . . . y | Data Record N | |

The packaging time, DWORD TIME, accurate to seconds, is the time taken to package multiple data records into a Data Record Packet, and a same Data Record Packet can be packaged for one time at the most, no matter how many times the packet is resent and to which CGF it is sent, the packaging time remains constant; moreover, in order to ensure the uniqueness of a data packet, sequence numbers of data packets within one second cannot be duplicated, that is to say, before a response message from the CGF is received, a maximum of 65536 Data Record Packets can be consecutively sent within one second.

Accordingly, when the CGF sends the Data Record Transfer Response to the GSN, an IE: Packet Transfer Response Command is added, as shown in the above Table 7; besides distinguishing whether the Data Record Packet responded is a possibly duplicated packet or a normal packet, the IE-Packet Transfer Response Command can also indicate that the response message includes packaging time. In addition, an IE: Sequence Numbers of Packets With Time is added, which is as shown in Table 11.

TABLE 11

| Class | Octets | Data | Note |
|---|---|---|---|
| IE-T | 1 | Type = 247 | Indicating IE-Sequence Numbers of Packets With Time |
| IE-L | 2 . . . 3 | Length | |
| IE-V | 4 . . . 5 | Sequence Number 1 | |
| | 6 . . . 9 | DWORD TIME 1 | Indicating that packaging UTC time begins from Jan. 1st, 1970 |
| | n . . . n + 1 | Sequence Number N | |
| | n + 2 . . . n + 5 | DWORD TIME N | |

Through the above expansion of the message, the CGF can more accurately judge, by "sequence number+packaging time", whether a Data Record Packet is received successfully; and the GSN also can send a maximum of 65536 Data Record Packets to the CGF within one second, thus utilizing the high-speed network performance to the most extent. The specific flow and procedures will be described respectively below.

Table 12 shows a data structure of sequence numbers of data packets maintained by the CGF and the GSN. In the structure, each sequence number corresponds to a packaging time list of a received Data Record Packet, and the packaging time in the list should be sorted in a chronological order; in addition, the number of the packaging times in the list should be limited (limited by a preset threshold), such as the number is limited to 5, which indicates, for a same sequence number, the GSN and the CGF maintain packaging time of at least 5 seconds.

TABLE 12

| Sequence Number | Packaging time List |
|---|---|
| 0 | dwTime0a, dwTime0b . . . |
| 1 | dwTime1a, dwTime1b . . . |
| 2 | dwTime2a, dwTime2b . . . |
| . . . | . . . |
| 65535 | dwTime65535a, dwTime65535b . . . |

Before packaging, the GSN judges in advance whether the number of the packaging time in the packaging time list corresponding to a sequence number to be used is smaller than 5, and if smaller than 5, packaging can be performed; otherwise, it means that the GSN does not receive, within at least 5 seconds, from the CGF, a response to the data packet corresponding to the sequence number to be used, there must be an abnormality in the network connection, and thus packaging cannot be proceeded.

After receiving a data packet message sent by the GSN, i.e., the Data Record Transfer Request, the CGF compares the packaging time thereof with packaging time in the packaging time list corresponding to a same sequence number as the local sequence number, and if they are equal, it means that the packet is already received before and should be discarded; otherwise, it means that the packet is a completely new packet and is desired to be received. After the packet is received, it is also desired to judge whether the packaging time is larger than/equal to 5, and if the packaging time is larger than/equal to 5, the earliest packaging time needs to be deleted, and then the newly-received packaging time is added into the packaging time list; otherwise, the newly-received packaging time is directly added into the packaging time list.

When receiving a Data Record Packet response message (the Data Record Transfer Response) from the CGF, the GSN is desired to release packaging time maintained locally according to sequence numbers and packaging time of the Date Record Packets in the response message, thus enabling subsequently new packaging operations to insert new packaging time.

Figure 9:
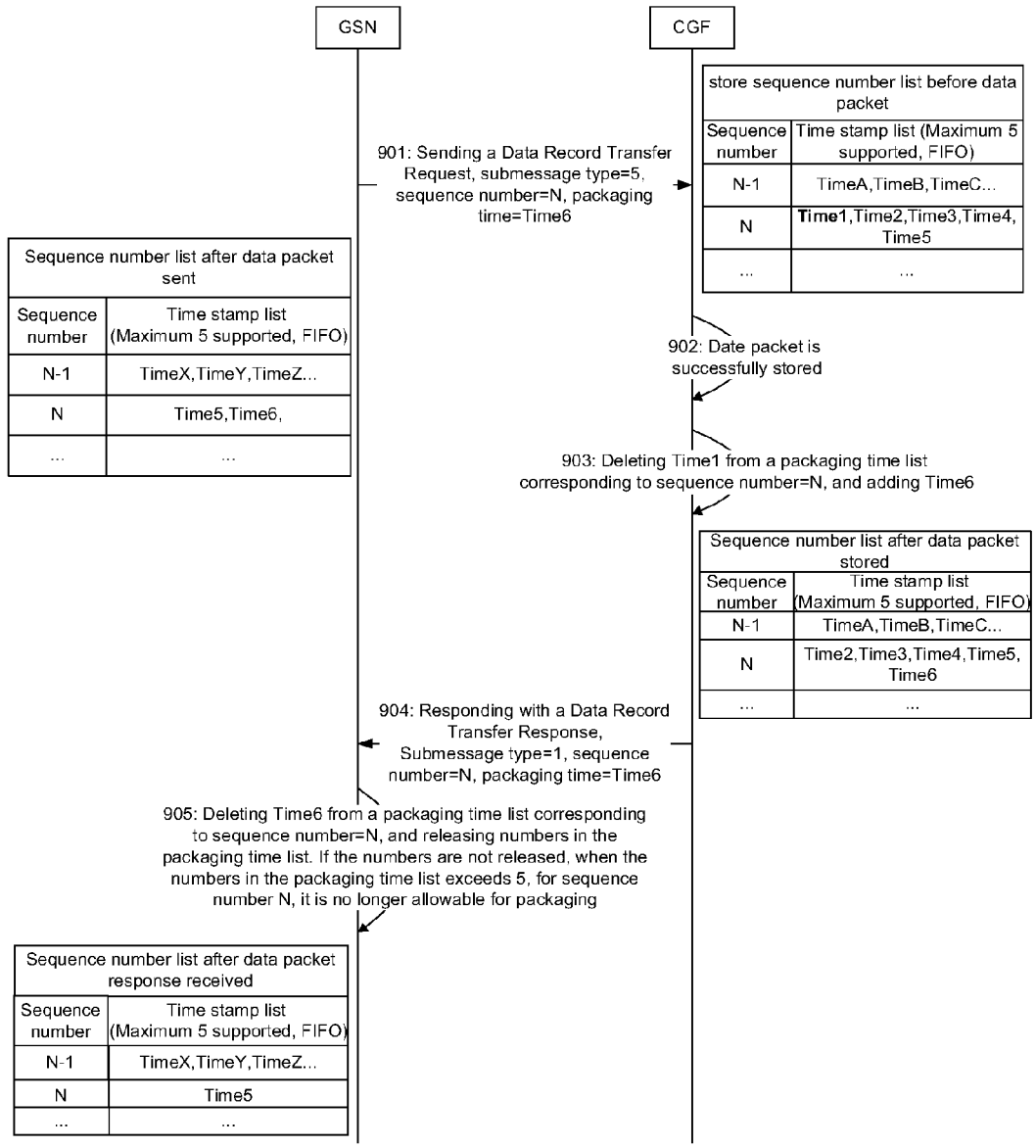
FIG. 9 is a schematic diagram of a transmission process of Data Record Packets with packaging time in normal circumstances according to embodiments of the disclosure.

FIG. 9 shows the transmission process of Data Record Packets with packaging time in normal circumstances, and the transmission process includes the following steps:

Step 901: A GSN sends a Data Record Packet to a CGF, and the corresponding message is a Data Record Transfer Request, wherein Packet Transfer Command=5 indicates a Send Data Record Packet With Time, the sequence number in the message header is N, and the packaging time is Time6.

Step 902: The CGF receives and processes the message, and stores the data record included in the Data Record Packet locally.

Step 903: The CGF deletes Time1 from a packaging time list corresponding to sequence number=N, and adds Time6.

Step 904: The CGF sends a response message to the GSN, and the corresponding message is a Data Record Transfer Response, wherein Packet Transfer Response Command=1 indicates that the sequence number of a normal packet is responded, the Sequence Numbers of Packets With Time parameter includes the sequence number N and the packaging time Time6, and the Cause parameter is set to Request Accepted.

Step 905: The GSN deletes Time6 from a packaging time list corresponding to SeqNo=N, and releases the number of packaging times in the packaging time list. If the number of packaging times is not released, when the number in the packaging time list exceeds 5, the sequence number N is no longer allowable for packaging.

If the GSN fails to receive a response, the GSN will resend the data record packet within a preset interval and for a preset number of times.

Figure 10:
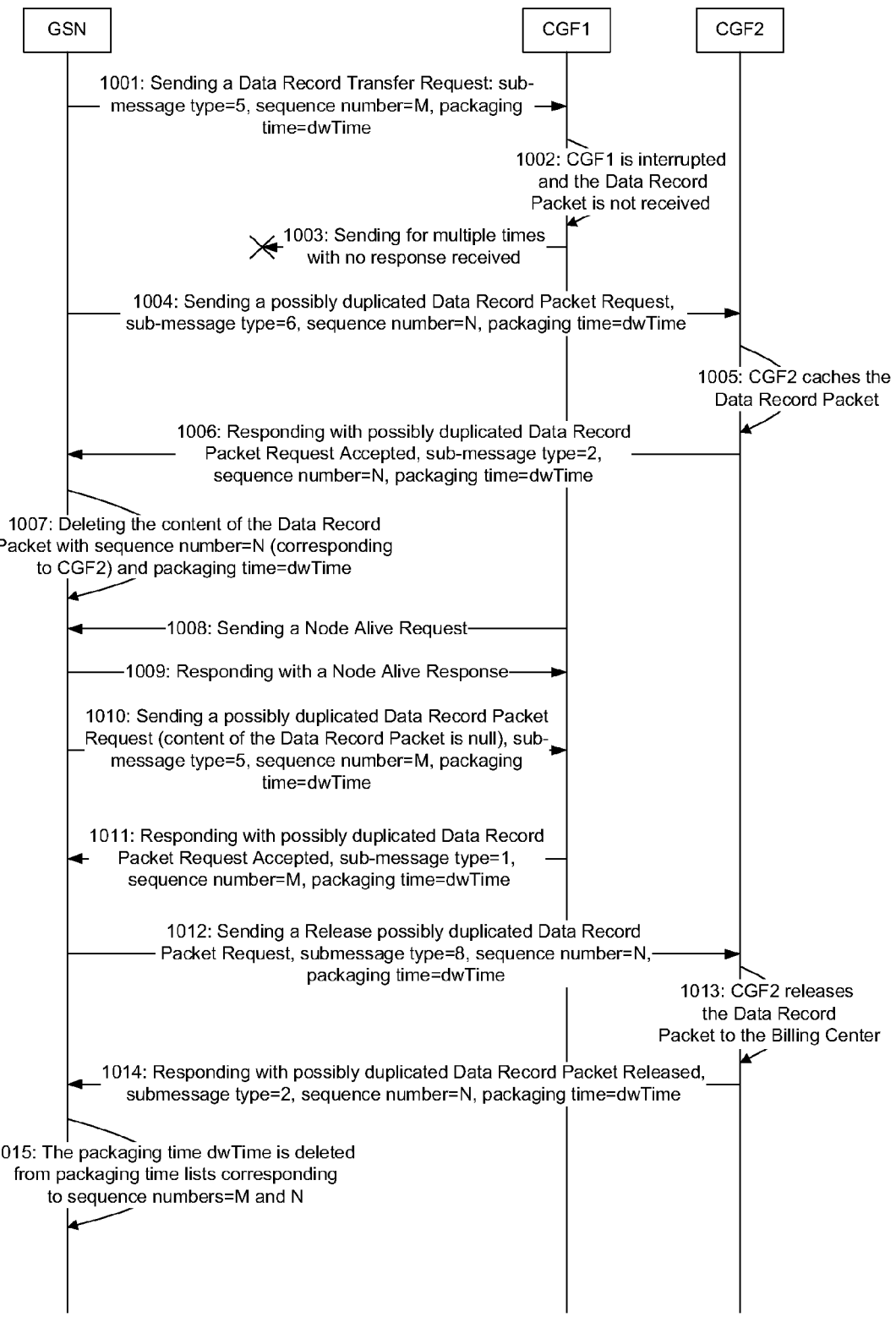
FIG. 10 is a schematic diagram of a transmission process in the case that the connection between a GSN and CGF1 is interrupted before a Data Record Packet is not yet correctly received according to embodiments of the disclosure.

FIG. 10 shows a transmission process in the case that the GSN and CGF1 are disconnected before a Data Record Packet is correctly received, and the transmission process not only achieves high-speed transmission of Data Record Packets with packaging time, but also achieves that the sequence number of the normal packet is independent of the sequence number of the possibly duplicated packet. The flow as shown in FIG. 10 mainly includes the following steps:

Step 1001: A GSN sends a Data Record Transfer Request message to CGF1 (primary CGF), wherein Packet Transfer Command=5 indicates a Send Data Record Packet With Time, the sequence number in the message header is M, and the packaging time is dwTime.

Step 1002: Since the GSN loses connection with CGF1, CGF1 does not receive the Data Record Packet.

Step 1003: GSN cannot receive a response from CGF1.

Step 1004: The GSN detects (by Echo Request) its link with CGF2 (standby CGF), and if the link is normal, the GSN sends, the same Data Record Packet as sent to CGF1, to CGF2 by the Data Record Transfer Request message, wherein Packet Transfer Command=6 indicates a Send possibly duplicated Data Record Packet With Time, the sequence number in the message header is N, and the packaging time is dwTime.

Step 1005: CGF2 receives and processes the Data Record Packet, since the Data Record Packet is identified as possibly duplicated, CGF2 only caches the Data Record Packet, and does not immediately send it to a BS.

Step 1006: CGF2 sends a correct reception acknowledgement message to the GSN by a Data Record Transfer Response message, wherein the Packet Transfer Response Command=2 indicates that the sequence number of the possibly duplicated packet is responded, Sequence Numbers of Packets With Time parameter includes the sequence number N and the packaging time dwTime, and the Cause parameter is set to Request Accepted.

Step 1007: The GSN can delete the Data Record Packet successfully sent (which may be duplicated), but still retain the sequence numbers of the Data Record Packet sent to CGF1 and CGF2 (i.e., M and N) and the packaging time dwTime.

Step 1008: After being recovered, CGF1 sends a Node Alive Request message to the GSN, and the GSN learns that it can communicate with CGF1.

Step 1009: The GSN acknowledges by a Node Alive Response message.

Step 1010: For the Data Record Transfer Request message not acknowledged above, i.e., Packet Transfer Command=5 indicates a Send Data Record Packet With Time, the GSN sends a null testing Data Record Packet to CGF1, and the null Data Record Packet is a packet in which only data of data records is not included in the Data Record Packet With Time parameter and others remain the same (the sequence number in the message header is still M, and the packaging time is also dwTime).

Step 1011: CGF1 responds with a Data Record Transfer Response message, wherein Packet Transfer Response Command=1 indicates that the sequence number of the normal Data Record Packet is responded, the Sequence Numbers of Packets With Time parameter includes the sequence number M and the packaging time dwTime, and the Cause parameter is set to Request Accepted. Since the GSN has already lost connection with CGF1, CGF1 does not receive any Data Record Packet, and thus CGF1 regards the testing Data Record Packet as a new one which is acceptable.

Step 1012: After receiving a response message from CGF1, the GSN learns that CGF1 does not process the testing Data Record Packet, and notifies CGF2 that it can send the testing Data Record Packet to the BS, the message adopted is a Data Record Transfer Request, and Packet Transfer Command=8 indicates Release Data Record Packet With Time. Wherein the Sequence Numbers of the Released Packets parameter includes the sequence number N and the packaging time dwTime.

Step 1013: CGF2 can send the Data Record Packet to the BS.

Step 1014: CGF2 sends a Data Record Transfer Response message to the GSN, wherein Packet Transfer Response Command=2 indicates that the sequence number of the possibly duplicated packet is responded, the Sequence Numbers of Packets With Time parameter includes the sequence number N and the packaging time dwTime, and the Cause parameter is set to Request Accepted.

Step 1015: For CGF1, dwTime is deleted from a packaging time list corresponding to sequence number=M, and the number of packaging times in the packaging time list is released; while for CGF2, dwTime is deleted from a packaging time list corresponding to sequence number=N, and the number of packaging times in the packaging time list is released, this indicates that the data packet is completely and successfully processed. If the number is not released, when the number in the packaging time list exceeds 5, the sequence number M of CGF1 and the sequence number N of CGF2 will cause it unallowable for further packaging.

Figure 11:
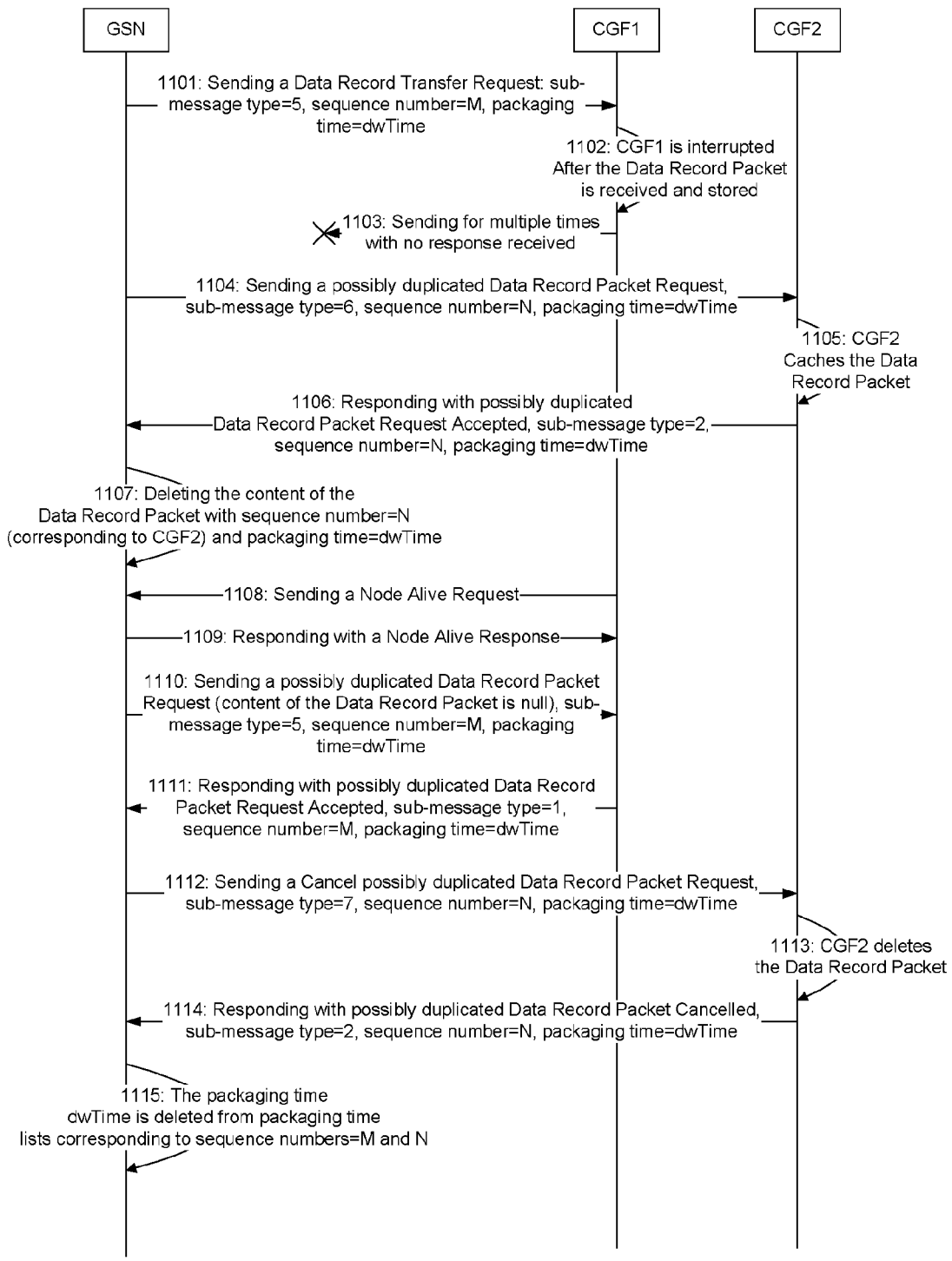
FIG. 11 is a schematic diagram of a transmission process in the case that the connection between a GSN and CGF1 is interrupted after a Data Record Packet is already correctly received according to embodiments of the disclosure.

FIG. 11 shows a transmission process in the case that a GSN and a CGF1 are disconnected after a Data Record Packet is already correctly received, and the transmission process not only achieves high-speed transmission of Data Record Packets with packaging time, but also achieves that the sequence number of the normal packet is independent of the sequence number of the possibly duplicated packet. The flow as shown in FIG. 11 mainly includes the following steps:

Step 1101: A GSN sends a Data Record Transfer Request message to CGF1 (primary CGF), wherein Packet Transfer Command=5 indicates a Send Data Record Packet With Time, the sequence number in the message header is M, and the packaging time is dwTime.

Step 1102: After receiving the Data Record Packet, CGF1 stores safely the data records included in the Data Record Packet.

Step 1103: The communications between the GSN and CGF1 is interrupted, and the GSN cannot receive a response from CGF1.

Step 1104: The GSN detects (by an Echo Request) its link with CGF2 (standby CGF), and if the link is normal, the GSN sends, the same Data Record Packet as sent to CGF1, to CGF2 by the Data Record Transfer Request message, wherein Packet Transfer Command=6 indicates a Send possibly duplicated Data Record Packet With Time, the sequence number in the message header is N, and the packaging time is dwTime.

Step 1105: CGF2 receives and processes the Data Record Packet, since the Data Record Packet is identified as possibly duplicated, CGF2 only caches the Data Record Packet, and does not immediately send it to a BS.

Step 1106: CGF2 sends a correct reception acknowledgement message to the GSN by a Data Record Transfer Response message, wherein the Packet Transfer Response Command=2 indicates the sequence number of the possibly duplicated packet is responded, Sequence Numbers of Packets With Time parameter includes the sequence number N and the packaging time dwTime, and the Cause parameter is set to Request Accepted.

Step 1107: The GSN can delete the Data Record Packet successfully sent (which may be duplicated), but still retain the sequence numbers of the Data Record Packet sent to CGF1 and CGF2 (i.e., M and N) and the packaging time dwTime.

Step 1108: After being recovered, CGF1 sends a Node Alive Request message to the GSN, and the GSN learns that it can communicate with CGF1.

Step 1109: The GSN acknowledges by a Node Alive Response message.

Step 1110: For the Data Record Transfer Request message not acknowledged above (in Step 1101), i.e., Packet Transfer Command=5 indicates a Send Data Record Packet With Time, the GSN sends a null testing Data Record Packet to CGF1, and the null Data Record Packet is a packet in which only data of data records is not included in the Data Record Packet With Time parameter and others remain the same (the sequence number in the message header is still M, and the packaging time is also dwTime).

Step 1111: CGF1 responds with a Data Record Transfer Response message, wherein Packet Transfer Response Command=1 indicates that the sequence number of the normal Data Record Packet is responded, the Sequence Numbers of Packets With Time parameter includes the sequence number M and the packaging time dwTime, and the Cause parameter is set to Request related to possibly duplicated packets already fulfilled. Since CGF1 stored the Data Record Packets before losing connection with the GSN, CGF1 considers the testing Data Record Packet as duplicated.

Step 1112: After receiving a response message from CGF1, the GSN learns that CGF1 does not process the testing Data Record Packet, and notifies CGF2 to cancel the Data Record Packet, the message adopted is a Data Record Transfer Request, and Packet Transfer Command=7 indicates Cancel Data Record Packet With Time. Wherein the Sequence Numbers of the Released Packets parameter includes the sequence number N and the packaging time dwTime.

Step 1113: CGF2 deletes the Data Record Packet from the cache.

Step 1114: CGF2 sends a Data Record Transfer Response message to the GSN, wherein Packet Transfer Response Command=2 indicates that the sequence number of the possibly duplicated packet is responded, the Sequence Numbers of Packets With Time parameter includes the sequence number N and the packaging time dwTime, and the Cause parameter is set to Request Accepted.

Step 1115: For CGF1, dwTime is deleted from a packaging time list corresponding to sequence number=M, and the number of packaging times in the packaging time list is released; while for CGF2, dwTime is deleted from a packaging time list corresponding to sequence number=N, and the number of packaging times in the packaging time list is released, this indicates that the data packet is completely and successfully processed. If the number of packaging times is not released, when the number of packaging times in the packaging time list exceeds 5, the sequence number M of CGF1 and the sequence number N of CGF2 cause it unallowable for further packaging.

Figure 12:
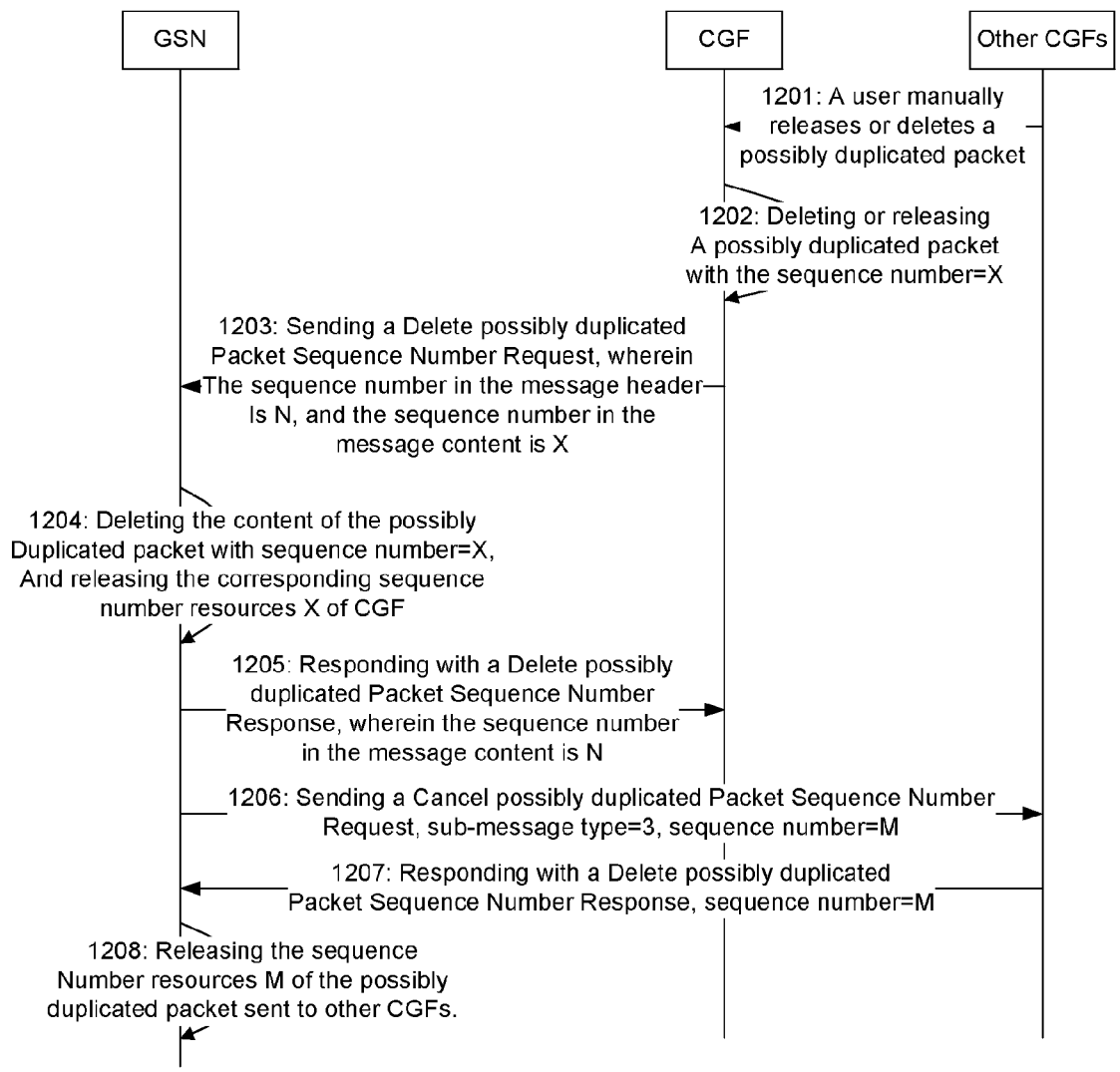
FIG. 12 is a schematic diagram of a processing process for manually deleting or releasing a possibly duplicated packet (packaging time not included) according embodiments of the disclosure.

FIG. 12 shows a process for manually deleting or releasing a possibly duplicated packet (packaging time not included), and the process mainly includes the following steps:

Step 1201: A user manually deletes or releases a possibly duplicated packet with the sequence number=X in a CGF.

Step 1202: The CGF releases/deletes the corresponding local possibly duplicated packet with the sequence number=X.

Step 1203: The CGF sends a Delete possibly duplicated Packet Sequence Number Request message to a GSN, the sequence number of the message is N, and the message body (Sequence Numbers of Packets) includes the sequence number X of the possibly duplicated packet.

Specifically, the structure of the Delete possibly duplicated Packet Sequence Number Request message is as shown in Table 13.

TABLE 13

| Information Element | Presence requirement |
|---|---|
| Sequence Numbers of Packets | Conditional |
| Sequence Numbers of Packets With Time | Conditional |
| Private Extension | Optional |

The message body of the Delete possibly duplicated Packet Sequence Number Request message includes an IE-Sequence Numbers of Packets, and the structure of the IE-Sequence Numbers of Packets is as shown in Table 14.

TABLE 14

| Class | Octets | Data | Note |
|---|---|---|---|
| IE-T | 1 | Type = 246 | Indicating IE-Sequence Numbers of Packets |
| IE-L | 2 . . . 3 | Length | |
| IE-V | 4 . . . 5 | Sequence Number 1 | |
| | . . . | | |
| | n . . . n + 1 | Sequence Number N | |

Step 1204: After receiving the message, the GSN looks up locally whether there is a corresponding sequence number X of the possibly duplicated packet, and if there is, the sequence number X of the possibly duplicated packet is deleted; if there is not, it is not processed.

Step 1205: The GSN sends a Delete possibly duplicated Packet Sequence Number Response message to the CGF, and the sequence number of an IE-Requests Responded in the message is N.

Specifically, the structure of the Delete possibly duplicated Packet Sequence Number Response message is as shown in Table 15, and the structure of the IE-Requests Responded is as shown in above Table 6.

TABLE 15

| Information Element | Presence requirement |
|---|---|
| Requests Responded | Mandatory |
| Private Extension | Optional |

Step 1206: If the possibly duplicated packet has been sent to other CGFs, the GSN is desired to send a Data Record Transfer Request to the other CGFs, wherein Packet Transfer Command=3 (packaging time not included) indicates deleting the possibly duplicated packet; the sequence numbers corresponding to the other CGFs also need to be deleted, so as to prevent the possibly duplicated packet from subsequently being released or deleted in the other CGFs Step 1207: The other CGFs send a Data Record Transfer Response message to the GSN.

Step 1208: The content of the possibly duplicated packet and its corresponding sequence number resource are deleted.

Figure 13:
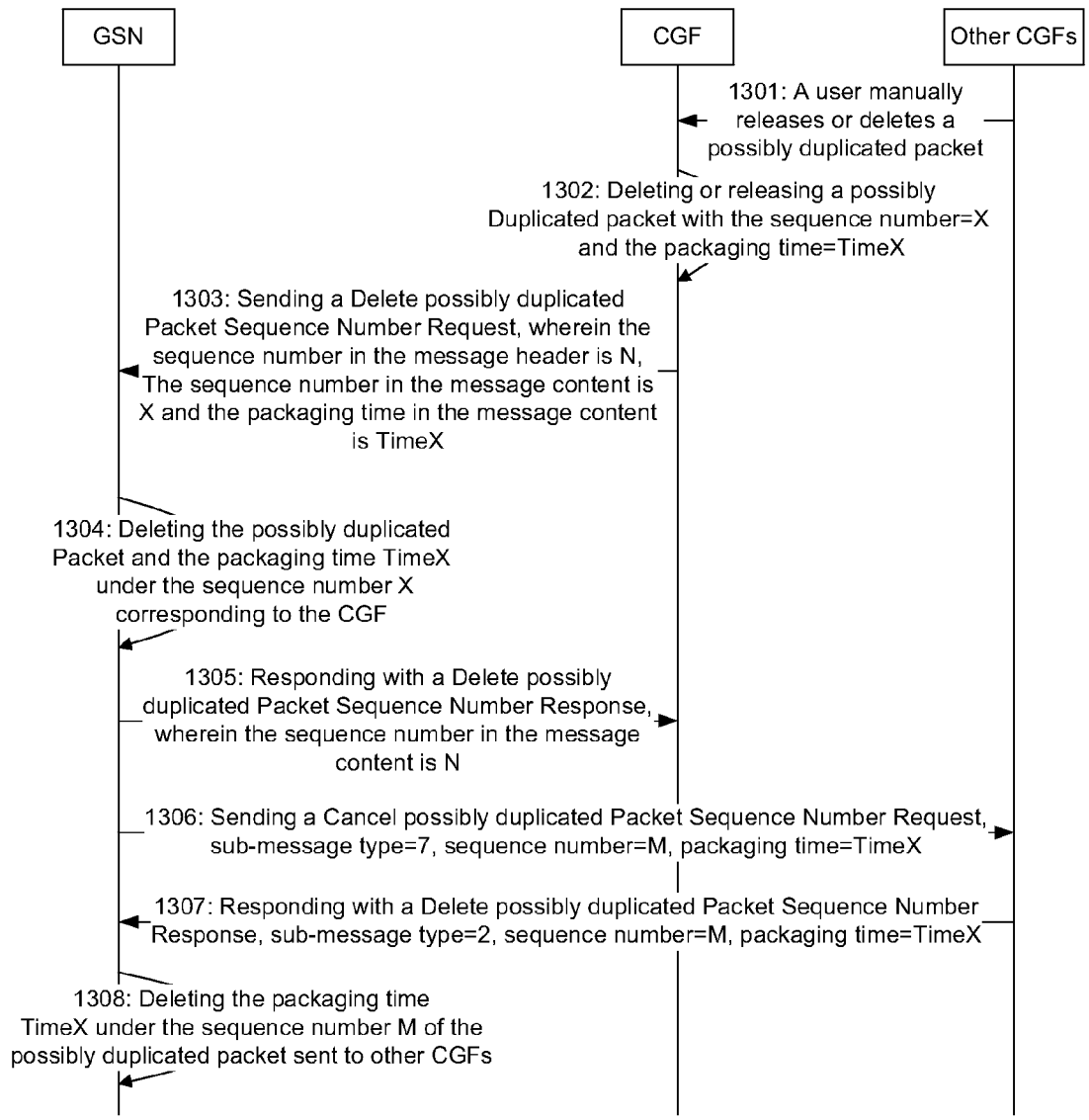
FIG. 13 is a schematic diagram of a processing process for manually deleting or releasing a possibly duplicated packet (packaging time included) according embodiments of the disclosure.

FIG. 13 shows a process for manually deleting or releasing a possibly duplicated packet (packaging time included), and the process mainly includes the following steps:

Step 1301: A user manually deletes or releases a possibly duplicated packet with the sequence number=X and packaging time=TimeX in a CGF.

Step 1302: The CGF releases/deletes the corresponding local possibly duplicated packet with the sequence number=X and packaging time=TimeX.

Step 1303: The CGF sends a Delete possibly duplicated Packet Sequence Number Request message to a GSN, the sequence number of the message is N, and the message body (Sequence Numbers of Packets With Time) includes the sequence number X and packaging time=TimeX of the possibly duplicated packet.

Specifically, the structure of the Delete possibly duplicated Packet Sequence Number Request message is as shown in above Table 13; the message body of the Delete possibly duplicated Packet Sequence Number Request message includes an IE-Sequence Numbers of Packets With Time, the structure of which is as shown in above Table 11.

Step 1304: After receiving the message, the GSN looks up locally whether there is a corresponding sequence number X of the possibly duplicated packet and packaging time=TimeX, and if there is, the packaging time TimeX under the sequence number X is deleted.

Step 1305: The GSN sends a Delete possibly duplicated Packet Sequence Number Response message to the CGF, and the sequence number of an IE-Requests Responded in the message is N.

Specifically, the structure of the Delete possibly duplicated Packet Sequence Number Response message is as shown in above Table 15.

Step 1306: If the possibly duplicated packet has been sent to other CGFs, the GSN is desired to send a Data Record Transfer Request to the other CGFs, wherein Packet Transfer Command=7 (packaging time TimeX included) indicates deleting the possibly duplicated packet; the packaging times under the sequence numbers corresponding to the other CGFs also need to be deleted, so as to prevent the possibly duplicated packet from subsequently being released or deleted in the other CGFs Step 1307: The other CGFs send a Data Record Transfer Response message to the GSN, wherein Packet Transfer Response Command=2 indicates that the sequence number of the possibly duplicated packet is responded.

Step 1308: The packaging time TimeX under the sequence number=M of the possibly duplicated packet sent to the other CGFs is deleted, indicating that the data packet is completely and successfully processed.

To sum up, the above operation flow for implementing embodiments of the disclosure is desired to expand the GTP' as follows.

1. In the message body of a Data Record Transfer Response message, a mandatory IE-Packet Transfer Response Command is added (for distinguish whether a responded sequence number is for a normal packet or for a possibly duplicated packet), thus implementing separated maintenances of the sequence numbers of the normal packet and possibly duplicated packet; the structure of a new Data Record Transfer Response message is as shown in the above Table 8, wherein the structure of an IE-Packet Transfer Response Command is as shown in the above Table 7; and the structure of an IE-Sequence Numbers of Packets With Time is as shown in the above Table 11.

2. A Delete possibly duplicated Packet Sequence Number Request message and a Delete possibly duplicated Packet Sequence Number Response message are added, and the content of the message includes an IE-Sequence Numbers of Packets or an IE-Sequence Numbers of Packets With Time, which is used for a CGF to notify a GSN to delete packaging time corresponding to the sequence number of a possibly duplicated packet sent to the CGF after the possibly duplicated packet is manually deleted/released; the structure of the Delete possibly duplicated Packet Sequence Number Request message is as shown in the above Table 13, the structure of the Delete possibly duplicated Packet Sequence Number Response message is as shown in the above Table 15, wherein the structure of an IE-Sequence Numbers of Packets is as shown in the above Table 14, the structure of an IE-Sequence Numbers of Packets With Time is as shown in the above Table 11, and the structure of an IE-Requests Responded is as shown in the above Table 6.

It should be noted that the IE-Sequence Numbers of Packets without packaging time is added so as to be compatible with the GTP' which does not support packaging time.

3. In the IE-Packet Transfer Command in the message body of the Data Record Transfer Request, the following four commands are added:

Send Data Record Packet With Time (such as corresponding to Packet Transfer Command=5);

Send possibly duplicated Data Record Packet With Time (such as corresponding to Packet Transfer Command=6);

Cancel Data Record Packet With Time (such as corresponding to Packet Transfer Command=7); and Release Data Record Packet With Time (such as corresponding to Packet Transfer Command=8).

The structure of the new Data Record Transfer Request message is as shown in the above Table 9.

4. An IE-Data Record Packet With Time is added, and its structure is same as the structure of the existing IE-Data Record Packet, and a DWORD TIME is added to the structure of the IE-Data Record Packet for indicating packaging time. The structure of the IE-Data Record Packet With Time is as shown in the above Table 10.

Based on the above method for processing a Data Record Packet, the disclosure further provides a system for processing a Data Record Packet, and the system includes a GSN and a CGF. Specifically, the GSN is configured to send the Data Record Packet to the CGF, wherein the Data Record Packet is a normal packet or a possibly duplicated packet, and the message header of a message for sending Data Record Packet includes a sequence number and the message body includes packaging time; and the CGF is configured to receive the Data Record Packet sent by the GSN and send a response message of receiving the Data Record Packet to the GSN, wherein the Packet Transfer Response Command information element in the response message is used to indicate whether the response message is for the normal packet or the possibly duplicated packet.

Preferably, the GSN is further configured to: maintain a packaging time list of the Data Record Packet corresponding to the sequence number, wherein packaging times in the packaging time list are sorted in a chronological order; and before the Data Record Packet is packaged, judge whether the number of packaging times in the packaging time list corresponding to a sequence number to be used is larger than a preset threshold, and if it is larger, stop packaging; otherwise, continue packaging, and send the packaged Data Record Packet to the CGF, wherein the message header of a message for sending Data Record Packet includes the sequence number to be used and the message body includes the packaging time of the Data Record Packet.

Preferably, the CGF is further configured to: after receiving a Send Data Record Packet message from the GSN, compare the packaging time of the Data Record Packet with packaging time in a packaging time list maintained locally by the CGF and corresponding to a same sequence number as the sequence number of the Data Record Packet, and if there is a same packaging time as the packaging time of the Data Record Packet in the packaging time list maintained locally by the CGF, discard the Data Record Packet; otherwise, receive the Data Record Packet.

Preferably, the CGF is further configured to: after the Data Record Packet is received, judge whether the number of the packaging time in the packaging time list maintained locally is larger than/equal to a preset threshold, and if so, delete the earliest packaging time in the packaging time list, and add a newly-received packaging time into the packaging time list; otherwise, add directly the new-received packaging time into the packaging time list.

Preferably, the CGF is further configured to delete or release, under the control of a network administrator, the possibly duplicated packet cached by the CGF itself, and send a Delete possibly duplicated Packet Sequence Number Request message to the GSN, wherein the message body includes the sequence number and packaging time of the deleted possibly duplicated packet;

accordingly, after receiving the Delete possibly duplicated Packet Sequence Number Request message, the GSN looks up whether there is a sequence number and packaging time corresponding to the possibly duplicated packet, and if there is, the GSN deletes the packaging time under the sequence number corresponding to the possibly duplicated packet, and responds to the CGF with a Delete possibly duplicated Packet Sequence Number Response message.

Preferably, the GSN is further configured to: after deleting the packaging time under the sequence number corresponding to the possibly duplicated packet, if the possibly duplicated packet has been sent to other CGFs, notify the other CGFs to delete the packaging time under the sequence number corresponding to the possibly duplicated packet;

accordingly, after deleting the packaging time under the sequence number corresponding to the possibly duplicated packet, the other CGFs respond to the GSN, wherein the Packet Transfer Response Command information element in the response message is used to indicate that the sequence number of the possibly duplicated packet is responded.

In addition, corresponding to the method for processing a Data Record Packet as shown in FIG. 12, the embodiment of the disclosure further provides a system for processing a Data Record Packet, and the system includes a GSN and a CGF, wherein the CGF is configured to delete or release, under the control of a network administrator, the possibly duplicated packet cached by the CGF itself, and send a Delete possibly duplicated Packet Sequence Number Request message to the GSN, wherein the message body includes the sequence number of the deleted possibly duplicated packet; and the GSN is configured to: after receiving the Delete possibly duplicated Packet Sequence Number Request message, look up whether there is a sequence number corresponding to the possibly duplicated packet, and if there is, delete the sequence number corresponding to the possibly duplicated packet, and respond to the CGF with a Delete possibly duplicated Packet Sequence Number Response message.

Preferably, the GSN is further configured to: after deleting the sequence number corresponding to the possibly duplicated packet, if the possibly duplicated packet has been sent to other CGFs, notify the other CGFs to delete the sequence number corresponding to the possibly duplicated packet;

accordingly, after deleting the sequence number corresponding to the possibly duplicated packet, the other CGFs respond to the GSN.

What described are merely preferable embodiments of the disclosure, and are not intended to limit the scope of the disclosure.

The invention claimed is:

1. A method for processing a Data Record Packet, comprising:
   sending, by a General Packet Radio Service Support Node (GSN), a Data Record Packet to a Charging Gateway Function (CGF) in a "Send Data Record Packet" message, wherein the Data Record Packet is a normal packet or a possibly duplicated packet, and the "Send Data Record Packet" message contains a sequence number in a message header and a packaging time in a message body; and
   sending, by the CGF, a response message to the GSN upon reception of the Data Record Packet, wherein the response message contains a "Packet Transfer Response Command" information element for identifying whether the response message is directed to a normal packet or a possibly duplicated packet.

2. The method for processing a Data Record Packet according to claim 1, further comprising:
   maintaining, by the GSN, a packaging time list for Data Record Packets, each Data Record Packet corresponding to a respective sequence number, wherein packaging times in the packaging time list are sorted in a chronological order; and
   judging, by the GSN, before the Data Record Packet is packaged, whether the packaging time list has a number of packaging times, which is larger than a preset threshold, corresponding to the sequence number to be used, and if yes, stopping packaging; otherwise, continuing packaging, and sending the packaged Data Record Packet to the CGF, wherein the "Send Data Record Packet" message contains the sequence number to be used in a message header and the packaging time of the Data Record Packet in a message body.

3. The method for processing a Data Record Packet according to claim 2, further comprising:
   comparing, by the CGF, after receiving the "Send Data Record Packet" message from the GSN, the packaging time of the Data Record Packet with one or more packaging times in the packaging time list maintained locally by the CGF and corresponding to the sequence number of the Data Record Packet, and when there is a packaging time in the packaging time list maintained locally by the CGF as same as the packaging time of the Data Record Packet, discarding the Data Record Packet; otherwise, receiving the Data Record Packet.

4. The method for processing a Data Record Packet according to claim 3, further comprising: after the Data Record Packet is received,
   judging, by the CGF, whether the number of the packaging times in the packaging time list maintained locally is larger than or equal to the preset threshold, and if yes, deleting an earliest packaging time in the packaging time list, and adding a newly-received packaging time into the packaging time list; otherwise, adding directly the new-received packaging time into the packaging time list.

5. The method for processing a Data Record Packet according to claim 3, further comprising:
   deleting or releasing, by the CGF, under control of a network administrator, a possibly duplicated packet cached by the CGF itself, and sending a "Delete possibly duplicated Packet Sequence Number Request" message to the GSN, wherein the message contains a sequence number and a packaging time of the deleted possibly duplicated packet in a message body; and
   looking up locally, by the GSN, after receiving the "Delete possibly duplicated Packet Sequence Number Request" message, the sequence number and the packaging time corresponding to the possibly duplicated packet, and when the sequence number and the packaging time are found in the packaging time list, deleting the packaging time under the sequence number corresponding to the possibly duplicated packet, and responding to the CGF with a "Delete possibly duplicated Packet Sequence Number Response" message.

6. The method for processing a Data Record Packet according to claim 2, further comprising:
   deleting or releasing, by the CGF, under control of a network administrator, a possibly duplicated packet cached by the CGF itself, and sending a "Delete possibly duplicated Packet Sequence Number Request" message to the GSN, wherein the message contains a sequence number and a packaging time of the deleted possibly duplicated packet in a message body; and
   looking up locally, by the GSN, after receiving the "Delete possibly duplicated Packet Sequence Number Request" message, the sequence number and the packaging time corresponding to the possibly duplicated packet, and when the sequence number and the packaging time are found in the packaging time list, deleting the packaging time under the sequence number corresponding to the possibly duplicated packet, and responding to the CGF with a "Delete possibly duplicated Packet Sequence Number Response" message.

7. The method for processing a Data Record Packet according to claim 1, further comprising:
   deleting or releasing, by the CGF, under control of a network administrator, a possibly duplicated packet cached by the CGF itself, and sending a "Delete possibly duplicated Packet Sequence Number Request" message to the GSN, wherein the message contains a sequence number and a packaging time of the deleted possibly duplicated packet in a message body; and
   looking up locally, by the GSN, after receiving the "Delete possibly duplicated Packet Sequence Number Request" message, the sequence number and the packaging time corresponding to the possibly duplicated packet, and when the sequence number and the packaging time are found in the packaging time list, deleting the packaging time under the sequence number corresponding to the possibly duplicated packet, and responding to the CGF with a "Delete possibly duplicated Packet Sequence Number Response" message.

8. The method for processing a Data Record Packet according to claim 7, further comprising, after the GSN deletes the packaging time under the sequence number corresponding to the possibly duplicated packet, when the possibly duplicated packet has been sent to other CGF(s), notifying, by the GSN, the other CGF(s) to delete the packaging time under the sequence number corresponding to the possibly duplicated packet; and after deleting the packaging time under the sequence number corresponding to the possibly duplicated packet, responding, by the other CGF(s), to the GSN with a response message containing the "Packet Transfer Response Command" information element for identifying the sequence number of the deleted possibly duplicated packet.

9. A system for processing a Data Record Packet, comprising a General Packet Radio Service Support Node (GSN) and a Charging Gateway Function (CGF), wherein the GSN is configured to send a Data Record Packet to the CGF in a "Send Data Record Packet" message, wherein the Data Record Packet is a normal packet or a possibly duplicated packet, and the "Send Data Record Packet" message contains a sequence number in a message header and a packaging time in a message body; and wherein the CGF is configured to receive the Data Record Packet from the GSN and send a response message to the GSN, wherein the response message contains a "Packet Transfer Response Command" information element for identifying whether the response message is directed to a normal packet or a possibly duplicated packet.

10. The system for processing a Data Record Packet according to claim 9, wherein the GSN is further configured to:

maintain a packaging time list for Data Record Packets, each Data Record Packet corresponding to a respective sequence number, wherein packaging times in the packaging time list is sorted in a chronological order; and before the Data Record Packet is packaged, judge whether the packaging time list has a number of packaging times, which is larger than a preset threshold, corresponding to the sequence number to be used, and if yes, stop packaging; otherwise, continue packaging, and send the packaged Data Record Packet to the CGF, wherein the "Send Data Record Packet" message contains the sequence number to be used in a message header and the packaging time of the Data Record Packet in a message body.

11. The system for processing a Data Record Packet according to claim 10, wherein the CGF is further configured to: after receiving a Send Data Record Packet message from the GSN, compare the packaging time of the Data Record Packet with packaging time in a packaging time list maintained locally by the CGF and corresponding to the same sequence number as the sequence number of the Data Record Packet, and when there is a packaging time in the packaging time list maintained locally by the CGF as same as the packaging time of the Data Record Packet, discard the Data Record Packet; otherwise, receive the Data Record Packet.

12. The system for processing a Data Record Packet according to claim 11, wherein the CGF is further configured to: after the Data Record Packet is received, judge whether the number of the packaging time in the packaging time list maintained locally is larger than or equal to a preset threshold, and if yes, delete the earliest packaging time in the packaging time list, and add a newly-received packaging time into the packaging time list; otherwise, add directly the new-received packaging time into the packaging time list.

13. The system for processing a Data Record Packet according to claim 11, wherein the CGF is further configured to delete or release, under the control of a network administrator, the possibly duplicated packet cached by the CGF itself, and send a "Delete possibly duplicated Packet Sequence Number Request" message to the GSN, wherein the message contains a sequence number and a packaging time of the deleted possibly duplicated packet in a message body; and wherein the GSN is further configured to, after receiving the Delete possibly duplicated Packet Sequence Number Request message, look up whether there is a sequence number and packaging time corresponding to the possibly duplicated packet, and when the sequence number and the packaging time are found, delete the packaging time under the sequence number corresponding to the possibly duplicated packet, and respond to the CGF with a "Delete possibly duplicated Packet Sequence Number Response" message.

14. The system for processing a Data Record Packet according to claim 8, wherein the CGF is further configured to delete or release, under the control of a network administrator, the possibly duplicated packet cached by the CGF itself, and send a "Delete possibly duplicated Packet Sequence Number Request" message to the GSN, wherein the message contains a sequence number and a packaging time of the deleted possibly duplicated packet in a message body; and wherein the GSN is further configured to, after receiving the Delete possibly duplicated Packet Sequence Number Request message, look up whether there is a sequence number and packaging time corresponding to the possibly duplicated packet, and when the sequence number and the packaging time are found, delete the packaging time under the sequence number corresponding to the possibly duplicated packet, and respond to the CGF with a "Delete possibly duplicated Packet Sequence Number Response" message.

15. The system for processing a Data Record Packet according to claim 9, wherein the CGF is further configured to delete or release, under the control of a network administrator, the possibly duplicated packet cached by the CGF itself, and send a "Delete possibly duplicated Packet Sequence Number Request" message to the GSN, wherein the message contains a sequence number and a packaging time of the deleted possibly duplicated packet in a message body; and wherein the GSN is further configured to, after receiving the Delete possibly duplicated Packet Sequence Number Request message, look up whether there is a sequence number and packaging time corresponding to the possibly duplicated packet, and when the sequence number and the packaging time are found, delete the packaging time under the sequence number corresponding to the possibly duplicated packet, and respond to the CGF with a "Delete possibly duplicated Packet Sequence Number Response" message.

16. The system for processing a Data Record Packet according to claim 15, wherein the GSN is further configured to: after deleting the packaging time under the sequence number corresponding to the possibly duplicated packet, if the possibly duplicated packet has been sent to other CGF(s), notify the other CGF(s) to delete the packaging time under the sequence number corresponding to the possibly duplicated packet; and wherein after deleting the packaging time under the sequence number corresponding to the possibly duplicated packet, the other CGF(s) respond(s) to the GSN with a response message containing the "Packet Transfer Response Command" information element for identifying the sequence number of the deleted possibly duplicated packet.

17. A method for processing a Data Record Packet, comprising:

deleting or releasing, by a Charging Gateway Function (CGF), under control of a network administrator, a possibly duplicated packet cached by the CGF itself, and sending a "Delete possibly duplicated Packet Sequence Number Request" message to a General Packet Radio Service Support Node (GSN), wherein the message contains a sequence number of the deleted possibly duplicated packet in a message body; and looking up locally, by the GSN, after receiving the "Delete possibly duplicated Packet Sequence Number Request" message, the sequence number and the packaging time corresponding to the possibly duplicated packet and when the sequence number and the packaging time are found in the packaging time list, deleting the sequence number corresponding to the possibly duplicated packet, and responding to the CGF with a "Delete possibly duplicated Packet Sequence Number Response" message.

18. The method for processing a Data Record Packet according to claim 17, further comprising: after the GSN deletes the sequence number corresponding to the possibly duplicated packet, if the possibly duplicated packet has been sent to other CGF(s), notifying, by the GSN, the other CGF(s) to delete the sequence number corresponding to the possibly duplicated packet; and after deleting the packaging time under the sequence number corresponding to the possibly duplicated packet, responding, by the other CGF(s), to the GSN.

19. A system for processing a Data Record Packet, comprising a General Packet Radio Service Supported Node (GSN) and a Charging Gateway Function (CGF), wherein the CGF is configured to delete or release, under control of a network administrator, a possibly duplicated packet cached by the CGF itself, and send a "Delete possibly duplicated Packet Sequence Number Request" message to the GSN, wherein the message contains a sequence number of the deleted possibly duplicated packet in a message body; and wherein the GSN is configured to: after receiving the "Delete possibly duplicated Packet Sequence Number Request" message, look up locally the sequence number and the packaging time corresponding to the possibly duplicated packet, and when the sequence number and the packaging time are found in the packaging time list, delete the sequence number corresponding to the possibly duplicated packet, and respond to the CGF with a Delete possibly duplicated Packet Sequence Number Response message.

20. The system for processing a Data Record Packet according to claim 19, wherein the GSN is further configured to: after deleting the sequence number corresponding to the possibly duplicated packet, if the possibly duplicated packet has been sent to other CGF(s), notify the other CGFs to delete the sequence number corresponding to the possibly duplicated packet;

wherein after deleting the sequence number corresponding to the possibly duplicated packet, the other CGF(s) respond(s) to the GSN.

\* \* \* \* \*